(12) United States Patent
Yoshimura et al.

(10) Patent No.: US 10,954,378 B2
(45) Date of Patent: Mar. 23, 2021

(54) SOLUBLE MATERIAL FOR THREE-DIMENSIONAL MOLDING

(71) Applicant: KAO CORPORATION, Tokyo (JP)

(72) Inventors: Tadanori Yoshimura, Wakayama (JP); Takuma Kimura, Tokyo (JP)

(73) Assignee: KAO CORPORATION, Tokyo (JP)

( * ) Notice: Subject to any disclaimer, the term of this patent is extended or adjusted under 35 U.S.C. 154(b) by 379 days.

(21) Appl. No.: 15/518,910

(22) PCT Filed: Oct. 2, 2015

(86) PCT No.: PCT/JP2015/078112
§ 371 (c)(1),
(2) Date: Apr. 13, 2017

(87) PCT Pub. No.: WO2016/059986
PCT Pub. Date: Apr. 21, 2016

(65) Prior Publication Data
US 2017/0232684 A1 Aug. 17, 2017

(30) Foreign Application Priority Data

Oct. 14, 2014 (JP) ................................. 2014-210081

(51) Int. Cl.
| | | |
|---|---|---|
| *C08L 55/02* | (2006.01) | |
| *B33Y 70/00* | (2020.01) | |
| *B33Y 10/00* | (2015.01) | |
| *B29C 67/00* | (2017.01) | |
| *C08F 220/04* | (2006.01) | |
| *C08F 222/02* | (2006.01) | |
| *C08F 220/14* | (2006.01) | |
| *C08F 220/18* | (2006.01) | |
| *B29C 64/40* | (2017.01) | |
| *B29C 64/106* | (2017.01) | |
| *C08L 1/02* | (2006.01) | |
| *C08K 3/34* | (2006.01) | |
| *C08K 3/40* | (2006.01) | |
| *C08K 7/14* | (2006.01) | |
| *C08L 33/12* | (2006.01) | |
| *C08L 67/04* | (2006.01) | |
| *B29C 64/118* | (2017.01) | |
| *B29K 55/02* | (2006.01) | |
| *B29K 67/00* | (2006.01) | |

(52) U.S. Cl.
CPC ............ *C08L 55/02* (2013.01); *B29C 64/106* (2017.08); *B29C 64/40* (2017.08); *B29C 67/00* (2013.01); *B33Y 10/00* (2014.12); *B33Y 70/00* (2014.12); *C08F 220/04* (2013.01); *C08F 220/14* (2013.01); *C08F 220/18* (2013.01); *C08F 222/02* (2013.01); *C08K 3/34* (2013.01); *C08K 3/40* (2013.01); *C08K 7/14* (2013.01); *C08L 1/02* (2013.01); *C08L 33/12* (2013.01); *C08L 67/04* (2013.01); *B29C 64/118* (2017.08); *B29K 2055/02* (2013.01); *B29K 2067/046* (2013.01); *C08K 2201/003* (2013.01); *C08K 2201/004* (2013.01); *C08L 2205/16* (2013.01)

(58) Field of Classification Search
CPC ..................................... C08L 1/02; C08L 1/04
See application file for complete search history.

(56) References Cited

U.S. PATENT DOCUMENTS

| | | |
|---|---|---|
| 3,390,034 A | 6/1968 | Hull |
| 6,790,403 B1 | 9/2004 | Priedeman, Jr. et al. |
| 7,332,537 B2 | 2/2008 | Bredt et al. |
| 7,910,041 B1 * | 3/2011 | Priedeman, Jr. ...... B29C 64/106 264/319 |

(Continued)

FOREIGN PATENT DOCUMENTS

| | | |
|---|---|---|
| CN | 102186918 A | 9/2011 |
| EP | 2514775 A1 | 10/2012 |

(Continued)

OTHER PUBLICATIONS

Cataldi et al. (ECCM16—16th European Conference on Composite Materials, Seville, Spain, Jun. 22-26, 2014) (Year: 2014).*
Beck-Candanedo et al. (Biomacromolecules 2005, 6, 1048-1054) (Year: 2005).*
Saito et al. (Biomacromolecules 2007, 8, 2485-2491) (Year: 2007).*
Polymer Procesing (Polyvinyl alcohol, 2001, http://www.polymerprocessing.com/polymers/PVOH.html) (Year: 2001).*
Benhamou et al. (Carbohydrate Polymers 99, 2014, 74-83) (Year: 2014).*
Extended European Search Report, dated Mar. 9, 2018, for European Application No. 15850615.4.

(Continued)

*Primary Examiner* — Liam J Heincer
(74) *Attorney, Agent, or Firm* — Birch, Stewart, Kolasch & Birch, LLP.

(57) ABSTRACT

The soluble material for three-dimensional modeling of the present invention is a soluble material for three-dimensional modeling that is used as a material of a support material that supports a three-dimensional object when manufacturing the three-dimensional object with a fused deposition modeling type 3D printer. The soluble material for three-dimensional modeling contains at least one polymer and at least one filler. In the soluble material for three-dimensional modeling, the filler is a fibrous filler having a fiber length of 0.02 μm to 1,000 μm and a fiber diameter of 0.0001 μm to 20 μm and/or a flat filler having a particle size of 0.1 μm to 20 μm and a thickness of 0.01 μm to 10 μm. The content of the filler is 0.01 part by mass to 200 parts by mass with respect to 100 parts by mass of the polymer. According to the present invention, foaming and a decrease of the accuracy of a three-dimensional object can be suppressed even when the soluble material for three-dimensional modeling is used in manufacture of the three-dimensional object with a 3D printer after being exposed to high humidity.

11 Claims, No Drawings

(56) References Cited

U.S. PATENT DOCUMENTS

| | | | |
|---|---|---|---|
| 8,246,888 B2* | 8/2012 | Hopkins | C08L 25/08 264/308 |
| 2003/0107158 A1 | 6/2003 | Levy | |
| 2008/0194762 A1* | 8/2008 | Sugasaki | C08G 18/3293 524/612 |
| 2009/0244703 A1 | 10/2009 | Asakura et al. | |
| 2010/0096072 A1 | 4/2010 | Hopkins et al. | |
| 2010/0136691 A1 | 6/2010 | Bertholdt | |
| 2010/0264566 A1* | 10/2010 | Moore | H01L 21/6835 264/401 |
| 2010/0285295 A1* | 11/2010 | Wang | C09J 11/04 428/292.4 |
| 2012/0097194 A1 | 4/2012 | McDaniel et al. | |
| 2013/0171439 A1* | 7/2013 | Shoseyov | B82Y 30/00 428/220 |
| 2013/0175218 A1* | 7/2013 | Chu | B01D 61/366 210/640 |
| 2013/0225779 A1 | 8/2013 | Ruggieri et al. | |
| 2013/0251890 A1* | 9/2013 | Lee | B01D 67/0004 427/58 |
| 2015/0017432 A1* | 1/2015 | Shoseyov | C09K 11/883 428/336 |
| 2015/0291752 A1* | 10/2015 | Sumnicht | C08J 5/18 524/34 |
| 2015/0368441 A1* | 12/2015 | Retsina | C08L 1/02 442/59 |
| 2016/0089720 A1* | 3/2016 | Kamakura | B29C 64/153 419/53 |
| 2016/0194462 A1* | 7/2016 | Wada | D21H 11/18 524/35 |
| 2016/0208087 A1* | 7/2016 | Virtanen | D06M 11/50 |
| 2016/0312022 A1 | 10/2016 | Niessner et al. | |
| 2017/0100817 A1 | 4/2017 | Ganapathiappan et al. | |
| 2018/0065092 A1* | 3/2018 | Mihranyan | B01D 67/0004 |
| 2018/0222111 A1 | 8/2018 | Bayer et al. | |
| 2018/0244890 A1 | 8/2018 | Hikmet et al. | |
| 2019/0375149 A1 | 12/2019 | Limem et al. | |
| 2020/0070404 A1 | 3/2020 | Bruggeman et al. | |
| 2020/0122386 A1 | 4/2020 | Hikmet et al. | |

FOREIGN PATENT DOCUMENTS

| | | |
|---|---|---|
| EP | 3208074 A1 | 8/2017 |
| JP | 2005-531439 A | 10/2005 |
| JP | 2008-507619 A | 3/2008 |
| JP | 2012-509777 A | 4/2012 |
| JP | 2014-511933 A | 5/2014 |
| WO | WO 2004/003823 A1 | 1/2004 |
| WO | WO 2006/020279 A2 | 2/2006 |
| WO | WO 2010/045147 A2 | 4/2010 |
| WO | WO 2012/143182 A1 | 10/2012 |

OTHER PUBLICATIONS

European Office Action issued in corresponding European Application No. 15850888.7 and dated Apr. 10, 2018.
Chinese Office Action and Search Report for Chinese Application No. 201580002830.0, dated May 9, 2017.
International Preliminary Report on Patentability and English translation of the Written Opinion of the International Searching Authority (Forms PCT/IB/338, PCT/IB/373 and PCT/ISA/237) for International Application No. PCT/JP2015/078112, dated Apr. 27, 2017.
International Preliminary Report on Patentability and English translation of the Written Opinion of the International Searching Authority (Forms PCT/IB/338, PCT/IB/373 and PCT/ISA/237) for International Application No. PCT/JP2015/078113, dated Apr. 27, 2017.
International Search Report and Written Opinion of the International Searching Authority (Forms PCT/ISA/210 and PCT/ISA/237) for International Application No. PCT/JP2015/078113, dated Dec. 22, 2015.
International Search Report issued in PCT/JP2015/078112 (PCT/ISA/210), dated Dec. 22, 2015.
Shofner et al., "Nanofiber-Reinforced Polymers Prepared by Fused Deposition Modeling", Journal of Applied Polymer Science, vol. 89, 2003, pp. 3081-3090.
Extended European Search Report, dated Feb. 21, 2020, for European Application No. 19212850.2.
U.S. Office Action, dated Mar. 6, 2020, for U.S. Appl. No. 15/518,812.
U.S. Notice of Allowance dated Apr. 29, 2020, for U.S. Appl. No. 15/518,812.
U.S. Appl. No. 15/518,812, filed Apr. 13, 2017.

* cited by examiner

SOLUBLE MATERIAL FOR THREE-DIMENSIONAL MOLDING

TECHNICAL FIELD

The present invention relates to a soluble material for three-dimensional modeling.

BACKGROUND ART

The present invention relates to a soluble material for three-dimensional modeling that is used as a material of a support material that supports a three-dimensional object when manufacturing the three-dimensional object with a 3D printer, especially a fused deposition modeling type 3D printer.

The 3D printer is one type of rapid prototyping, and it is a three-dimensional printer for modeling a three-dimensional object based on 3D data such as 3D CAD and 3D CG. Systems of 3D printing have been known, such as a fused deposition modeling system (hereinafter referred to as an FDM system), an inkjet ultraviolet curing system, an stereolithography system, and a selective laser sintering system. Among these systems, the FDM system is a modeling system of heat-melting, extruding, and laminating polymer filaments to obtain a three-dimensional object, and the FDM system does not use a reaction of the material unlike other systems. Accordingly, a 3D printer of an FDM system is small and inexpensive, and has become popular in recent years as an apparatus with less post-processing. In order to model a three-dimensional object having a more complex shape in a FDM system, a modeling material constituting the three-dimensional object and a support material for supporting a three-dimensional structure of the modeling material are laminated to obtain a precursor of the three-dimensional object, and then the support material is removed from the precursor of the three-dimensional object to obtain the target three-dimensional object.

An example of the method of removing the support material from the precursor of the three-dimensional object is a method of using a methacrylic acid copolymer as the support material and soaking the precursor of the three-dimensional object in an alkaline aqueous solution to remove the support material (for example, JP-T-2008-507619 and JP-T-2012-509777). The method utilizes that carboxylic acid in the methacrylic acid copolymer is neutralized by an alkali and dissolved in an alkaline aqueous solution.

SUMMARY OF THE INVENTION

The soluble material for three-dimensional modeling of the present invention is a soluble material for three-dimensional modeling that is used as a material of a support material that supports a three-dimensional object when manufacturing the three-dimensional object with a fused deposition modeling type 3D printer. The soluble material contains at least one polymer and at least one filler. The filler is a fibrous filler having a fiber length of 0.02 µm to 1,000 µm and a fiber diameter of 0.0001 µm to 20 µm and/or a flat filler having a particle size of 0.1 µm to 20 µm and a thickness of 0.01 µm to 10 µm. The content of the filler is 0.01 part by mass to 200 parts by mass with respect to 100 parts by mass of the polymer.

The method for manufacturing a three-dimensional object of the present invention is a method for manufacturing a three-dimensional object by fused deposition modeling, including a step of obtaining a precursor of a three-dimensional object containing the three-dimensional object and a support material, and a support material removing step of making the precursor of the three-dimensional object contact an alkaline aqueous solution and/or water to remove the support material. The material of the support material is the soluble material for three-dimensional modeling.

The support material of the present invention is a support material that supports a three-dimensional object when manufacturing the three-dimensional object by a fused deposition modeling type 3D printer, containing at least one polymer and at least one filler. In the support material, the filler is a fibrous filler having a fiber length of 0.02 µm to 1,000 µm and a fiber diameter of 0.0001 µm to 20 µm and/or a flat filler having a particle size of 0.1 µm to 20 µm and a thickness of 0.01 µm to 10 µm, and the content of the filler is 0.01 part by mass to 200 parts by mass with respect to 100 parts by mass of the polymer.

DETAILED DESCRIPTION OF THE INVENTION

When a soluble material for three-dimensional modeling that is the material of the support material is exposed to high humidity, the methacrylic acid copolymer contained in the soluble material for three-dimensional modeling absorbs moisture in the air since the soluble material has high affinity to moisture. When the soluble material for three-dimensional modeling containing the methacrylic acid copolymer containing moisture is heated, melted, printed, and laminated, the moisture evaporates due to high temperature and the soluble material for three-dimensional modeling is foamed, resulting a remarkable loss of the accuracy of the three-dimensional object.

The present invention provides a soluble material for three-dimensional modeling that is capable of suppressing foaming and a decrease of the accuracy of a three-dimensional object even when being used in manufacture of a three-dimensional object with a 3D printer after being exposed to high humidity, a method for manufacturing a three-dimensional object using the soluble material for three-dimensional modeling, and a support material.

The soluble material for three-dimensional modeling of the present invention is a soluble material for three-dimensional modeling that is used as a material of a support material that supports a three-dimensional object when manufacturing the three-dimensional object with a fused deposition modeling type 3D printer. The soluble material contains at least one polymer and at least one filler. In the soluble material, the filler is a fibrous filler having a fiber length of 0.02 µm to 1,000 µm and a fiber diameter of 0.0001 µm to 20 µm and/or a flat filler having a particle size of 0.1 µm to 20 µm and a thickness of 0.01 µm to 10 µm. The content of the filler is 0.01 part by mass to 200 parts by mass with respect to 100 parts by mass of the polymer.

The method for manufacturing a three-dimensional object of the present invention is a method for manufacturing a three-dimensional object by fused deposition modeling, including a step of obtaining a precursor of a three-dimensional object containing the three-dimensional object and a support material, and a support material removing step of making the precursor of the three-dimensional object contact an alkaline aqueous solution and/or water to remove the support material. In the method, the material of the support material is the soluble material for three-dimensional modeling.

The support material of the present invention is a support material that supports a three-dimensional object when manufacturing the three-dimensional object by a fused deposition modeling type 3D printer, containing at least one polymer and at least one filler. In the support material, the filler is a fibrous filler having a fiber length of 0.02 μm to 1,000 μm and a fiber diameter of 0.0001 μm to 20 μm and/or a flat filler having a particle size of 0.1 μm to 20 μm and a thickness of 0.01 μm to 10 μm, and the content of the filler is 0.01 part by mass to 200 parts by mass with respect to 100 parts by mass of the polymer.

The present invention can provide a soluble material for three-dimensional modeling that is capable of suppressing foaming and a decrease of the accuracy of a three-dimensional object even when being used in manufacture of a three-dimensional object with a 3D printer after being exposed to high humidity.

The present invention can provide a method for manufacturing a three-dimensional object that is capable of suppressing foaming and a decrease of the accuracy of a three-dimensional object even when the soluble material for three-dimensional modeling is used in manufacture of a three-dimensional object with a 3D printer after being exposed to high humidity.

The present invention can provide a support material that is capable of suppressing foaming and a decrease of the accuracy of a three-dimensional object even when the soluble material for three-dimensional modeling is used in manufacture of a three-dimensional object with a 3D printer after being exposed to high humidity.

One embodiment of the present invention will be explained below.

<Soluble Material for Three-Dimensional Modeling>

The soluble material for three-dimensional modeling of the present embodiment is a soluble material for three-dimensional modeling that is used as a material of a support material that supports a three-dimensional object when manufacturing the three-dimensional object with a fused deposition modeling type 3D printer. The soluble material contains at least one polymer and at least one filler. The filler is dispersed in the soluble material for three-dimensional modeling. In the soluble material, the filler is a fibrous filler having a fiber length of 0.02 μm to 1,000 μm and a fiber diameter of 0.0001 μm to 20 μm and/or a flat filler having a particle size of 0.1 μm to 20 μm and a thickness of 0.01 μm to 10 μm, and the content of the filler is 0.01 part by mass to 200 parts by mass with respect to 100 parts by mass of the polymer. The soluble material for three-dimensional modeling is capable of suppressing foaming and a decrease of the accuracy of a three-dimensional object even when being used in manufacture of a three-dimensional object with a 3D printer after being exposed to high humidity. The reason why the soluble material for three-dimensional modeling exhibits such an effect is not clear; however, it is presumed as below.

Various types of fillers were keenly examined based on a hypothesis that deformation of the material can be suppressed even when the moisture contained in the material evaporates outside the material at a high temperature if a network structure of the filler can be formed in the material and the interaction at the interface between the filler and the material (copolymer) can be enhanced. As a result, it was found that foaming can be suppressed by a specific filler. Because the specific filler has a small size and changes its shape, the surface area increases and the area of the interface between the filler and the polymer in the soluble material for three-dimensional modeling and the support material increases. It is believed that foaming when the moisture evaporates and the deformation of the support material caused by the foaming can be suppressed due to an increase of the region of interaction at the interface or entangling and interaction between pieces of the filler.

[Filler]

From the viewpoints of suppressing foaming even when the soluble material for three-dimensional modeling is used in manufacture of a three-dimensional object with a 3D printer after being exposed to high humidity and manufacturing the three-dimensional object with high accuracy, the filler is a fibrous filler having a fiber length of 0.02 μm to 1,000 μm and a fiber diameter of 0.0001 μm to 20 μm and/or a flat filler having a particle size of 0.1 μm to 20 μm and a thickness of 0.01 μm to 10 μm. Among these, the fibrous filler is preferable from the viewpoints of suppressing foaming and manufacturing a three-dimensional object with high accuracy.

[Fibrous Filler]

The fiber length of the fibrous filler is 0.02 μm or more, preferably 0.1 μm or more, and more preferably 0.2 μm or more from the viewpoints of suppressing foaming and manufacturing a three-dimensional object with high accuracy. The fiber length of the fibrous filler is 1,000 μm or less, preferably 500 μm or less, more preferably 100 μm or less, further preferably 50 μm or less, further more preferably 10 μm or less, and further more preferably 5 μm or less from the viewpoint of preventing nozzles of the 3D printer from clogging. From the combination of these viewpoints, the fiber length of the fibrous filler is 0.02 μm to 1,000 μm, preferably 0.1 μm to 500 μm, more preferably 0.2 μm to 100 μm, further preferably 0.2 μm to 50 μm, further more preferably 0.2 μm to 10 μm, and further more preferably 0.2 μm to 5 μm. In the present description, the fiber length is measured by the method described in the examples.

The fiber diameter of the fibrous filler is 0.0001 μm or more, and preferably 0.001 μm or more from the viewpoints of suppressing foaming and manufacturing a three-dimensional object with high accuracy. The fiber diameter of the fibrous filler is 20 μm or less, preferably 10 μm or less, more preferably 0.1 μm or less, further preferably 0.05 μm or less, and further more preferably 0.01 μm or less from the viewpoint of preventing nozzles of the 3D printer from clogging. From the combination of these viewpoints, the fiber diameter of the fibrous filler is 0.0001 μm to 20 μm, preferably 0.001 μm to 10 μm, more preferably 0.001 μm to 0.1 μm, further preferably 0.001 μm to 0.05 μm, and further more preferably 0.001 μm to 0.01 μm. In the present description, the fiber diameter is measured by the method described in the examples.

The aspect ratio of the fibrous filler is preferably 20 or more, more preferably 30 or more, further preferably 40 or more, further more preferably 50 or more, and further more preferably 70 or more from the viewpoints of suppressing foaming and manufacturing a three-dimensional object with high accuracy. The aspect ratio of the fibrous filler is preferably 10,000 or less, more preferably 5,000 or less, further preferably 1,000 or less, further more preferably 500 or less, and further more preferably 300 or less from the same viewpoints. From the combination of these viewpoints, the aspect ratio of the fibrous filler is preferably 20 to 10,000, more preferably 30 to 5,000, further preferably 40 to 1,000, further more preferably 50 to 500, and further more preferably 70 to 300. In the present description, the aspect ratio is measured by the method described in the examples.

[Flat Filler]

The particle size of the flat filler is 0.1 μm or more, preferably 0.2 μm or more, more preferably 0.5 μm or more, and further preferably 1 μm or more from the viewpoints of suppressing foaming and manufacturing a three-dimensional object with high accuracy. The particle size of the flat filler is 20 μm or less, preferably 15 μm or less, more preferably 10 μm or less, and further preferably 8 μm or less from the viewpoint of preventing nozzles of the 3D printer from clogging. From the combination of these viewpoints, the particle size of the flat filler is preferably 0.1 μm to 20 μm, more preferably 0.2 μm to 15 μm, more preferably 0.5 μm to 10 μm, and further preferably 1 μm to 8 μm. In the present description, the particle size means a median diameter and is measured by the method described in the examples.

The thickness of the flat filler is 0.01 μm or more, preferably 0.02 μm or more, more preferably 0.05 μm or more, and further preferably 0.1 μm or more from the viewpoints of suppressing foaming and manufacturing a three-dimensional object with high accuracy. The thickness of the flat filler is 10 μm or less, preferably 7 μm or less, more preferably 5 μm or less, and further preferably 1 μm or less from the viewpoint of preventing nozzles of the 3D printer from clogging. From the combination of these viewpoints, the thickness of the flat filler is 0.01 μm to 10 μm, more preferably 0.02 μm to 7 μm, further preferably 0.05 μm to 5 μm, and furthermore preferably 0.1 μm to 1 μm. In the present description, the thickness of the flat filler is measured by the method described in the examples.

The compounding amount of the filler is 0.01 part by mass or more, preferably 1 part by mass or more, more preferably 2 parts by mass or more, and further preferably 5 parts by mass or more with respect to 100 parts by mass of the polymer from the viewpoints of suppressing foaming and manufacturing a three-dimensional object with high accuracy. The compounding amount of the filler is 200 parts by mass or less, preferably 100 parts by mass or less, more preferably 50 parts by mass or less, further preferably 40 parts by mass or less, furthermore preferably 35 parts by mass or less, and furthermore preferably 30 parts by mass or less with respect to 100 parts by mass of the polymer from the viewpoints of suppressing foaming and manufacturing a three-dimensional object with high accuracy. From the combination of these viewpoints, the compounding amount of the filler is 0.01 part by mass to 200 parts by mass, preferably 0.01 part by mass to 100 parts by mass, more preferably 0.01 part by mass to 50 parts by mass, further preferably 1 part by mass to 40 parts by mass, further more preferably 2 parts by mass to 35 parts by mass, and furthermore preferably 5 parts by mass to 30 parts by mass with respect to 100 parts by mass of the polymer.

Examples of the material of the filler include glass, cellulose, a clay mineral, and a modified substance thereof. Among these, cellulose is preferable from the viewpoints of suppressing foaming and manufacturing a three-dimensional object with high accuracy.

The glass is preferably glass fibers and/or glass flakes, and more preferably glass fibers from the viewpoints of suppressing foaming and manufacturing a three-dimensional object with high accuracy.

Examples of the cellulose include cellulose fibers, cellulose nanofibers obtained by mechanically refining cellulose fibers, and cellulose single nanofibers that are cellulose obtained by an action of an N-oxyl compound. Among these, one or more fibers selected from the group consisting of cellulose nanofibers and cellulose single nanofibers are preferable, and cellulose single nanofibers are more preferable from the viewpoints of suppressing foaming and manufacturing a three-dimensional object with high accuracy. The content of carboxyl groups in the cellulose single nanofibers is 0.1 mmol/g or more, preferably 0.4 mmol/g or more, and more preferably 0.8 mmol/g or more from the viewpoint of stable refining, and preferably 3 mmol/g or less, more preferably 2.5 mmol/g or less, and further preferably 2.0 mmol/g or less from the viewpoint of improving the handleability.

The cellulose single nanofibers are cellulose fibers obtained by an action of an N-oxyl compound. The cellulose single nanofibers can be obtained by a method for manufacturing cellulose single nanofibers described in paragraphs 0026 to 0036 of JP-A-2011-140738 and paragraphs 0012 to 0029 of JP-A-2009-197122, for example. Particularly, the method for manufacturing cellulose single nanofibers is a method for manufacturing cellulose single nanofibers in which natural cellulose fibers are oxidized using an N-oxy compound to obtain carboxyl group-containing cellulose fibers, and cellulose single nanofibers are manufactured therefrom, in which an anionic cellulose derivative is added to the carboxyl group-containing cellulose fibers, and then a refining step of performing a refining treatment is performed. Because the cellulose single nanofibers manufactured by this method are fine, the surface area is large, and the area of the interface between the filler and the polymer in the soluble material for three-dimensional modeling and the support material increases. Accordingly, the foaming when the moisture evaporates and the deformation of the support material caused by the foaming can be suppressed due to an increase of the region of interaction at the interface or entangling and interaction between pieces of the filler.

From the viewpoints of effectively promoting the oxidation reaction and refining cellulose more finely for suppressing foaming and manufacturing a three-dimensional object with high accuracy, the N-oxyl compound is preferably at least one member selected from the group consisting of TEMPO (2,2,6,6-tetramethylpiperidine-1-oxyl), 4-hydroxy TEMPO (4-hydroxy-2,2,6,6-tetramethylpiperidine-1-oxyl), 4-amino TEMPO (4-amino-2,2,6,6-tetramethylpiperidine-1-oxyl), 4-acetoxy TEMPO (4-acetoxy-2,2,6,6-tetramethylpiperidine-1-oxyl), 4-carboxy TEMPO (4-carboxy-2,2,6,6-tetramethylpiperidine-1-oxyl), and 4-phosphonooxy TEMPO (4-phosphonooxy-2,2,6,6-tetramethylpiperidine-1-oxyl), and more preferably at least one member selected from the group consisting of TEMPO (2,2,6,6-tetramethylpiperidine-1-oxyl) and 4-hydroxy TEMPO (4-hydroxy-2,2,6,6-tetramethylpiperidine-1-oxyl).

A sodium salt of a carboxylic acid produced by oxidation of a hydroxyl group as a result of the oxidation reaction is formed in the cellulose nanofibers. However, the cellulose nanofibers can be converted into a carboxylic acid by making hydrochloric acid, sulfuric acid, etc. act on the cellulose nanofibers, and used in the form of being dispersed in various types of organic solvents (Yusuke Okita, et al., Biomacromolecules, vol. 12, 2011, pp. 518-522). The cellulose nanofibers converted into a carboxylic acid may be used in the form of a carboxylate other than the sodium salt, that is obtained by completely or partially neutralizing the cellulose nanofibers with an alkali such as potassium hydroxide, magnesium hydroxide, calcium hydroxide, ammonia, and an amine.

Examples of the clay mineral include talc, mica, synthetic mica, and clay, and among these, talc and/or mica are preferable, and talc is more preferable from the viewpoints of suppressing foaming and manufacturing a three-dimensional object with high accuracy.

An example of the modified substance is a substance having a surface modified with at least one member selected from the group consisting of a hydrocarbon group, fluorine, perfluoroalkyl, silane, polymer graft, and a surfactant. Among these, a substance having a surface modified with a hydrocarbon group and/or silane is preferable, and a substance having a surface modified with a hydrocarbon group is more preferable from the viewpoints of suppressing foaming and manufacturing a three-dimensional object with high accuracy. The hydrocarbon group may have a substituent and a hetero atom, and may also have a polyethylene unit and a polypropylene unit.

The modified substance is preferably modified cellulose from the viewpoints of enhancing the affinity with the polymers in the soluble material for three-dimensional modeling and enhancing the effect of suppressing foaming. From the viewpoints of enhancing the affinity with the polymers in the soluble material for three-dimensional modeling and enhancing the effect of suppressing foaming, examples of the modified cellulose include at least one of: (i) modified cellulose bonded with at least one member selected from the group consisting of an amino group, a carboxyl group, a straight chain or branched alkyl group having a hydroxyl group at an end thereof, an aryl group, a polyethylene glycol unit represented by the following formula (α), and a poly(ethylene glycol-propylene glycol) unit represented by the following formula (β) through one or more bonds selected from the group consisting of an amide bond, an ester bond, and an ether bond; (ii) modified cellulose obtained by adsorption and/or ionic bonding of a surfactant to the surface of the cellulose; and (iii) modified cellulose bonded with a polymer obtained by a method of using a radical-polymerizable monomer or a polymer such as polyester obtained from lactone or dicarboxylic acid/diol by graft polymerization. Among these, (i) modified cellulose in which at least one member selected from the group consisting of an amino group, a carboxyl group, a straight chain or branched alkyl group having a hydroxyl group at an end thereof, a polyethylene glycol group, and a poly(ethylene glycol-propylene glycol) group is introduced is preferable, and modified cellulose in which at least one member selected from the group consisting of a straight chain or branched alkyl group, a polyethylene glycol chain, and a poly(ethylene glycol-propylene glycol) chain is introduced through an amide bond is more preferable. Further, an example of modified cellulose nanofibers obtained by modifying carboxylic acid with an alkyl group through an amide bond is disclosed in JP-A-2013-151661, and an example of modified cellulose nanofibers obtained by modifying carboxylic acid with polyethylene glycol through an amide group is disclosed in WO2013/07735.

[Formula 1]

(α)

(wherein X represents an amide bond, an ester bond, or an ether bond; A represents an alkyl group, a phenyl group, or a hydroxyl group; and l represents an arbitrary number)

[Formula 2]

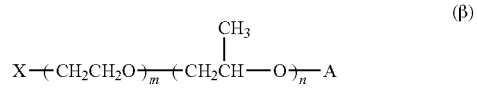
(β)

(wherein X represents an amide bond, an ester bond, or an ether bond; A represents an alkyl group, a phenyl group, or a hydroxyl group; and m and n each represent an arbitrary number)

The fiber length of the glass fibers and a modified substance thereof (hereinafter also referred to as the glass fibers, etc.) is 0.02 μm or more, preferably 0.1 μm or more, more preferably 0.2 μm or more, further preferably 5 μm or more, and further more preferably 10 μm or more from the viewpoints of suppressing foaming and manufacturing a three-dimensional object with high accuracy. The fiber length of the glass fibers, etc. is 1,000 μm or less, preferably 700 μm or less, more preferably 500 μm or less, further preferably 100 μm or less, and further more preferably 50 μm or less from the viewpoint of preventing nozzles of the 3D printer from clogging. From the combination of these viewpoints, the fiber length of the glass fibers, etc. is 0.02 μm to 1,000 μm, preferably 0.1 μm to 700 μm, more preferably 0.2 μm to 500 μm, further preferably 5 μm to 100 μm, and further more preferably 10 μm to 50 μm.

The fiber diameter of the glass fibers, etc. is preferably 0.01 μm or more, more preferably 0.1 μm or more, and further preferably 1 μm or more from the viewpoints of suppressing foaming and manufacturing a three-dimensional object with high accuracy. The fiber diameter of the glass fibers, etc. is preferably 20 μm or less, more preferably 10 μm or less, and further preferably 5 μm or less from the viewpoint of preventing nozzles of the 3D printer from clogging. From the combination of these viewpoints, the fiber diameter of the glass fibers, etc. is preferably 0.01 μm to 20 μm, more preferably 0.1 μm to 10 μm, and further preferably 1 μm to 5 μm.

The aspect ratio of the glass fibers, etc. is preferably 20 or more, more preferably 30 or more, further preferably 40 or more, further more preferably 50 or more, and further more preferably 70 or more from the viewpoints of suppressing foaming and manufacturing a three-dimensional object with high accuracy. The aspect ratio of the glass fibers, etc. is preferably 10,000 or less, more preferably 5,000 or less, further preferably 1,000 or less, further more preferably 500 or less, and further more preferably 300 or less from the same viewpoints. From the combination of these viewpoints, the aspect ratio of the glass fibers, etc. is preferably 20 to 10,000, more preferably 30 to 5,000, further preferably 40 to 1,000, furthermore preferably 50 to 500, and further more preferably 70 to 300.

The fiber length of the cellulose nanofibers, the cellulose single nanofibers, and a modified substance thereof (hereinafter also referred to as the cellulose nanofibers, etc.) is 0.02 μm or more, preferably 0.1 μm or more, and more preferably 0.2 μm or more from the viewpoints of suppressing foaming and manufacturing a three-dimensional object with high accuracy. The fiber length of the cellulose nanofibers, etc. is 1,000 μm or less, preferably 500 μm or less, more preferably 100 μm or less, further preferably 50 μm or less, and further more preferably 10 μm or less from the viewpoint of preventing nozzles of the 3D printer from clogging. From the combination of these viewpoints, the fiber length of the cellulose nanofibers, etc. is 0.02 μm to 1,000 µm, preferably 0.1 µm to 500 µm, more preferably 0.2 µm to 100 µm, further preferably 0.2 µm to 50 µm, and further more preferably 0.2 µm to 10 µm.

The fiber diameter of the cellulose nanofibers, etc. is 0.0001 µm or more, and preferably 0.001 µm or more from the viewpoints of suppressing foaming and manufacturing a three-dimensional object with high accuracy. The fiber diameter of the cellulose nanofibers, etc. is 20 µm or less, preferably 10 µm or less, more preferably 0.1 µm or less, further preferably 0.05 µm or less, and further more preferably 0.01 µm or less from the viewpoint of preventing nozzles of the 3D printer from clogging. From the combination of these viewpoints, the fiber diameter of the cellulose nanofibers, etc. is 0.0001 µm to 20 µm, preferably 0.001 µm to 10 µm, more preferably 0.001 µm to 0.1 µm, further preferably 0.001 µm to 0.05 µm, and further more preferably 0.001 µm to 0.01 µm.

The aspect ratio of the cellulose nanofibers, etc. is preferably 20 or more, more preferably 30 or more, further preferably 40 or more, further more preferably 50 or more, and further more preferably 70 or more from the viewpoints of suppressing foaming and manufacturing a three-dimensional object with high accuracy. The aspect ratio of the cellulose nanofibers, etc. is preferably 10,000 or less, more preferably 5,000 or less, further preferably 1,000 or less, further more preferably 500 or less, and furthermore preferably 300 or less from the same viewpoints. From the combination of these viewpoints, the aspect ratio of the cellulose nanofibers, etc. is preferably 20 to 10,000, more preferably 30 to 5,000, further preferably 40 to 1,000, further more preferably 50 to 500, and further more preferably 70 to 300.

The particle size of the talc, mica, and a modified substance thereof (hereinafter also referred to as the talc, mica, etc.) is 0.1 µm or more, preferably 0.2 µm or more, more preferably 0.5 µm or more, and further preferably 1 µm or more from the viewpoints of suppressing foaming and manufacturing a three-dimensional object with high accuracy. The particle size of the talc, mica, etc. is 20 µm or less, preferably 15 µm or less, more preferably 10 µm or less, and further preferably 8 µm or less from the viewpoint of preventing nozzles of the 3D printer from clogging. From the combination of these viewpoints, the particle size of the talc, mica, etc. is preferably 0.1 µm to 20 µm, more preferably 0.2 µm to 15 µm, more preferably 0.5 µm to 10 µm, and further preferably 1 µm to 8 µm.

The thickness of the talc, mica, etc. is 0.01 µm or more, preferably 0.02 µm or more, more preferably 0.05 µm or more, and further preferably 0.1 µm or more from the viewpoints of suppressing foaming and manufacturing a three-dimensional object with high accuracy. The thickness of the talc, mica, etc. is preferably 10 µm or less, more preferably 7 µm or less, further preferably 5 µm or less, further more preferably 1 µm or less, and further more preferably 0.5 µm or less from the viewpoint of preventing nozzles of the 3D printer from clogging. From the combination of these viewpoints, the thickness of the talc, mica, etc. is 0.01 µm to 10 µm, more preferably 0.02 µm to 7 µm, further preferably 0.05 µm to 5 µm, further more preferably 0.1 µm to 1 µm, and further more preferably 0.1 µm to 0.5 µm.

[Polymer]

The polymer can be used without particular limitation as long as the polymer is used in the soluble material for three-dimensional modeling according to the FDM system. However, the polymer preferably contains a copolymer A having a hydrophilic monomer unit and a hydrophobic monomer unit, or at least one polymer B selected from the group consisting of polyvinyl alcohol, poly(2-ethyl-2-oxazoline), polyethylene glycol, an ethylene glycol propylene glycol copolymer, a sulfonate, a carboxylate, and water-soluble polyester and/or polyamide in which a polyethylene oxide unit is introduced from the viewpoints of improving the dissolution rate in an alkaline aqueous solution and the modeling properties by the 3D printer.

[Copolymer A]

The copolymer A is at least one member selected from the group consisting of the following (I) to (IV):

(I) Copolymer having a hydrophilic monomer unit represented by the following formula (1) and at least one member selected from the group consisting of hydrophobic monomer units represented by the following formulae (5) to (7), in which the content of the hydrophilic monomer unit in the copolymer is 20% by mass to 80% by mass (hereinafter also referred to as a copolymer (I));

(II) Copolymer having a hydrophilic monomer unit represented by the following formula (2) and at least one member selected from the group consisting of a hydrophobic monomer unit represented by the following formula (8), in which the content of the hydrophilic monomer unit in the copolymer is 20% by mass to 80% by mass (hereinafter also referred to as a copolymer (II));

(III) Copolymer having a hydrophilic monomer unit represented by the following formula (3) and a hydrophobic monomer unit represented by the following formula (9), in which the content of the hydrophilic monomer unit in the copolymer is 20% by mass to 80% by mass (hereinafter also referred to as a copolymer (III)); and (IV) Copolymer having a hydrophilic monomer unit represented by the following formula (4) and at least one member selected from the group consisting of hydrophobic monomer units represented by the following formulae (5) and (6), in which the content of the hydrophilic monomer unit in the copolymer is 20% by mass to 80% by mass (hereinafter also referred to as a copolymer (IV)):

[Formula 3]

[Formula 4]

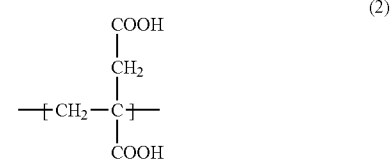

[Formula 5]

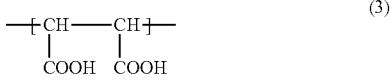

[Formula 6]

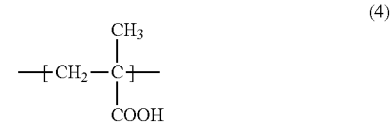

-continued

[Formula 7]

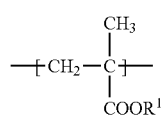
(5)

(wherein $R^1$ represents a straight chain alkyl group or a branched alkyl group each having 1 to 8 carbon atoms)

[Formula 8]

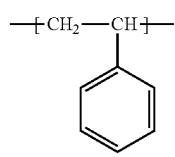
(6)

[Formula 9]

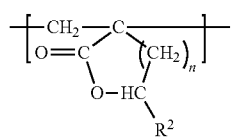
(7)

(wherein n is 1 to 3, and $R^2$ represents a hydrogen atom or a methyl group)

[Formula 10]

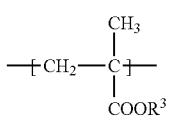
(8)

(wherein $R^3$ represents an alkyl group having 1 or 2 carbon atoms)

[Formula 11]

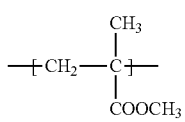
(9)

[Copolymer (I)]

The copolymer (I) is a copolymer having a hydrophilic monomer unit represented by the formula (1) (hereinafter also referred to as a hydrophilic monomer unit A) and at least one hydrophobic monomer unit selected from the group consisting of hydrophobic monomer units represented by the formulae (5) to (7) (hereinafter also referred to as a hydrophobic monomer unit A), in which the content of the hydrophilic monomer unit A in the copolymer (I) is 20% by mass to 80% by mass.

[Hydrophilic Monomer Unit A]

The hydrophilic monomer unit A is a monomer unit derived by polymerizing acrylic acid.

The content of the hydrophilic monomer unit A in the copolymer (I) is 20% by mass or more, preferably 22% by mass or more, and more preferably 30% by mass or more from the viewpoint of improving the dissolution rate in an alkaline aqueous solution. The content of the hydrophilic monomer unit A in the copolymer (I) is 80% by mass or less, preferably 60% by mass or less, and more preferably 55% by mass or less from the viewpoint of the storage stability of the soluble material for three-dimensional modeling and the support material obtained from the soluble material for three-dimensional modeling. From the combination of these viewpoints, the content of the hydrophilic monomer unit A in the copolymer (I) is 20% by mass to 80% by mass, preferably 22% by mass to 60% by mass, and more preferably 30% by mass to 55% by mass.

[Hydrophobic Monomer Unit A]

(Monomer Unit Represented by Formula (5))

The monomer unit represented by the formula (5) is a monomer unit derived by polymerizing an alkyl acrylate corresponding thereto.

In the formula (5), $R^1$ is preferably at least one member selected from the group consisting of a methyl group, an ethyl group, an n-propyl group, an i-propyl group, an n-butyl group, an i-butyl group, a t-butyl group, and a 2-ethylhexyl group. Among these, $R^1$ is more preferably at least one member selected from the group consisting of a methyl group, an ethyl group, and an n-butyl group, and further preferably a methyl group and/or an ethyl group from the viewpoints of improving the dissolution rate in an alkaline aqueous solution and the modeling properties by the 3D printer.

(Monomer Unit Represented by Formula (6))

The monomer unit represented by the formula (6) is a monomer unit derived by polymerizing styrene.

(Monomer Unit Represented by Formula (7))

The monomer unit represented by the formula (7) is a monomer unit derived by polymerizing an α-methylene-γ-valerolactone corresponding thereto.

Among the hydrophobic monomer units represented by the formulae (5) to (7), a monomer unit in which $R^1$ in the formula (5) is a methyl group, an ethyl group, or an n-butyl group, and a styrene monomer unit represented by the formula (6) are preferable, and a monomer unit in which $R^1$ in the formula (5) is a methyl group or an ethyl group, and a styrene monomer unit represented by the formula (6) are more preferable from the viewpoint of improving the dissolution rate.

The content of the hydrophobic monomer unit A in the copolymer (I) is preferably 20% by mass or more, more preferably 30% by mass or more, further preferably 40% by mass or more, and further more preferably 45% by mass or more from the viewpoint of the storage stability of the soluble material for three-dimensional modeling and the support material obtained from the soluble material for three-dimensional modeling. The content of the hydrophobic monomer unit A in the copolymer (I) is preferably 80% by mass or less, more preferably 75% by mass or less, and further preferably 70% by mass or less from the viewpoint of improving the dissolution rate in an alkaline aqueous solution. From the combination of these viewpoints, the content of the hydrophobic monomer unit A in the copolymer (I) is preferably 20% by mass to 80% by mass, more preferably 30% by mass to 80% by mass, more preferably 40% by mass to 75% by mass, and further preferably 45% by mass to 70% by mass.

The copolymer (I) may contain monomer units other than the hydrophilic monomer unit A and the hydrophobic monomer unit A as long as the effect of the soluble material for three-dimensional modeling according to the present embodiment is not impaired. Examples of the monomer units other than the hydrophilic monomer unit A and the hydrophobic monomer unit A include one or more monomer units selected from the group consisting of a monomer unit represented by the formula (2), a monomer unit represented by the formula (3), a monomer unit represented by the formula (4), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

[Copolymer (II)]

The copolymer (II) is a copolymer having a hydrophilic monomer unit represented by the formula (2) (hereinafter also referred to as a hydrophilic monomer unit B) and at least one hydrophobic monomer unit selected from the group consisting of hydrophobic monomer units represented by the formula (8) (hereinafter also referred to as a hydrophobic monomer unit B), in which the content of the hydrophilic monomer unit B in the copolymer (II) is 20% by mass to 80% by mass.

[Hydrophilic Monomer Unit B]

The hydrophilic monomer unit B is a monomer unit derived by polymerizing itaconic acid.

The content of the hydrophilic monomer unit B in the copolymer (II) is 20% by mass or more, preferably 22% by mass or more, more preferably 30% by mass or more, and further preferably 35% by mass or more from the viewpoint of improving the dissolution rate in an alkaline aqueous solution. The content of the hydrophilic monomer unit B in the copolymer (II) is 80% by mass or less, preferably 60% by mass or less, more preferably 55% by mass or less, and further preferably 50% by mass or less from the viewpoint of the storage stability of the soluble material for three-dimensional modeling and the support material obtained from the soluble material for three-dimensional modeling. From the combination of these viewpoints, the content of the hydrophilic monomer unit B in the copolymer (II) is 20% by mass to 80% by mass, preferably 22% by mass to 60% by mass, more preferably 30% by mass to 55% by mass, and further preferably 35% by mass to 50% by mass.

[Hydrophobic Monomer Unit B]

(Monomer Unit Represented by Formula (8))

The hydrophobic monomer unit represented by the formula (8) is a monomer unit derived by polymerizing an alkyl acrylate corresponding thereto.

In the formula (8), $R^1$ is at least one member selected from the group consisting of a methyl group and an ethyl group. Among these, $R^1$ is preferably a methyl group from the viewpoint of improving the dissolution rate in an alkaline aqueous solution.

The content of the hydrophobic monomer unit B in the copolymer (II) is preferably 20% by mass or more, more preferably 40% by mass or more, further preferably 45% by mass or more, and further more preferably 50% by mass or more from the viewpoint of the storage stability of the soluble material for three-dimensional modeling and the support material obtained from the soluble material for three-dimensional modeling. The content of the hydrophobic monomer unit B in the copolymer (II) is preferably 80% by mass or less, more preferably 78% by mass or less, further preferably 70% by mass or less, and further preferably 65% by mass or less from the viewpoint of improving the dissolution rate in an alkaline aqueous solution. From the combination of these viewpoints, the content of the hydrophobic monomer unit B in the copolymer (II) is preferably 20% by mass to 80% by mass, more preferably 40% by mass to 78% by mass, further preferably 45% by mass to 70% by mass, and more preferably 50% by mass to 65% by mass.

The copolymer (II) may contain monomer units other than the hydrophilic monomer unit B and the hydrophobic monomer unit B as long as the effect of the soluble material for three-dimensional modeling according to the present embodiment is not impaired. Examples of the monomer units other than the hydrophilic monomer unit B and the hydrophobic monomer unit B include one or more monomer units selected from the group consisting of a monomer unit represented by the formula (1), a monomer unit represented by the formula (3), a monomer unit represented by the formula (4), a monomer unit that is a hydrophobic monomer unit represented by the formula (5) in which $R^1$ is a straight chain alkyl group or a branched alkyl group having 3 to 8 carbon atoms, a hydrophobic monomer unit represented by the formula (6), a hydrophobic monomer unit represented by the formula (7), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

[Copolymer (III)]

The copolymer (III) is a copolymer having a hydrophilic monomer unit represented by the formula (3) (hereinafter also referred to as a hydrophilic monomer unit C) and a hydrophobic monomer unit represented by the formula (9) (hereinafter also referred to as a hydrophobic monomer unit C), in which the content of the hydrophilic monomer unit C in the copolymer (III) is 20% by mass to 80% by mass.

[Hydrophilic Monomer Unit C]

The hydrophilic monomer unit C is a monomer unit derived by polymerizing maleic acid and/or fumaric acid.

The content of the hydrophilic monomer unit C in the copolymer (III) is 20% by mass or more, preferably 22% by mass or more, and more preferably 30% by mass or more from the viewpoint of improving the dissolution rate in an alkaline aqueous solution. The content of the hydrophilic monomer unit C in the copolymer (III) is 80% by mass or less, preferably 60% by mass or less, more preferably 55% by mass or less, further preferably 50% by mass or less, and furthermore preferably 45% by mass or less from the viewpoint of the storage stability of the soluble material for three-dimensional modeling and the support material obtained from the soluble material for three-dimensional modeling. From the combination of these viewpoints, the content of the hydrophilic monomer unit C in the copolymer (III) is 20% by mass to 80% by mass, preferably 22% by mass to 60% by mass, more preferably 30% by mass to 55% by mass, further preferably 30% by mass to 50% by mass, and further more preferably 30% by mass or 45% by mass.

[Hydrophobic Monomer Unit C]

(Monomer Unit Represented by Formula (9))

The hydrophobic monomer unit represented by the formula (9) is a monomer unit derived by polymerizing methyl methacrylate.

The content of the hydrophobic monomer unit C in the copolymer (III) is preferably 20% by mass or more, more preferably 40% by mass or more, further preferably 45% by mass or more, furthermore preferably 50% by mass or more, and further more preferably 55% by mass or more from the viewpoint of the storage stability of the soluble material for three-dimensional modeling and the support material obtained from the soluble material for three-dimensional modeling. The content of the hydrophobic monomer unit C in the copolymer (III) is preferably 80% by mass or less, more preferably 78% by mass or less, and further preferably 70% by mass or less from the viewpoint of improving the dissolution rate in an alkaline aqueous solution. From the combination of these viewpoints, the content of the hydrophobic monomer unit C in the copolymer (III) is preferably 20% by mass to 80% by mass, more preferably 40% by mass to 78% by mass, further preferably 45% by mass to 70% by mass, further more preferably 50% by mass to 70% by mass, and further more preferably 55% by mass to 70% by mass.

The copolymer (III) may contain monomer units other than the hydrophilic monomer unit C and the hydrophobic monomer unit C as long as the effect of the soluble material for three-dimensional modeling according to the present embodiment is not impaired. Examples of the monomer units other than the hydrophilic monomer unit C and the hydrophobic monomer unit C include one or more monomer units selected from the group consisting of a monomer unit represented by the formula (1), a monomer unit represented by the formula (2), a monomer unit represented by the formula (4), a monomer unit that is a hydrophobic monomer unit represented by the formula (5) in which $R^1$ is a straight chain alkyl group or a branched alkyl group having 2 to 8 carbon atoms, a monomer unit represented by the formula (6), a monomer unit represented by the formula (7), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

[Copolymer (IV)]

The copolymer (IV) is a copolymer having a hydrophilic monomer unit represented by the formula (4) (hereinafter also referred to as a hydrophilic monomer unit D) and at least one member selected from the group consisting of hydrophobic monomer units represented by the formulae (5) to (6) (hereinafter also referred to as a hydrophobic monomer unit D), in which the content of the hydrophilic monomer unit D in the copolymer (IV) is 20% by mass to 80% by mass.

[Hydrophilic Monomer Unit D]

The hydrophilic monomer unit D is a monomer unit derived by polymerizing methacrylic acid.

The content of the hydrophilic monomer unit D in the copolymer (IV) is 20% by mass or more, preferably 22% by mass or more, and more preferably 30% by mass or more from the viewpoint of improving the dissolution rate in an alkaline aqueous solution. The content of the hydrophilic monomer unit D in the copolymer (IV) is 80% by mass or less, preferably 60% by mass or less, and more preferably 55% by mass or less from the viewpoint of the storage stability of the soluble material for three-dimensional modeling and the support material obtained from the soluble material for three-dimensional modeling. From the combination of these viewpoints, the content of the hydrophilic monomer unit D in the copolymer (IV) is 20% by mass to 80% by mass, preferably 22% by mass to 60% by mass, and more preferably 30% by mass to 55% by mass.

[Hydrophobic Monomer Unit D]

(Monomer Unit Represented by Formula (5))

The hydrophobic monomer unit represented by the formula (5) is a monomer unit derived by polymerizing an alkyl acrylate corresponding thereto.

In the formula (5), $R^1$ is preferably at least one member selected from the group consisting of a methyl group, an ethyl group, an n-propyl group, an i-propyl group, an n-butyl group, an i-butyl group, a t-butyl group, and a 2-ethylhexyl group. Among these, $R^1$ is more preferably at least one member selected from the group consisting of a methyl group, an ethyl group, and an n-butyl group, and further preferably a methyl group and/or an ethyl group from the viewpoints of improving the dissolution rate in an alkaline aqueous solution and the modeling properties by the 3D printer.

(Monomer Unit Represented by Formula (6))

The monomer unit represented by the formula (6) is a monomer unit derived by polymerizing styrene.

Among the hydrophobic monomer units D, a monomer unit in which $R^1$ in the formula (5) is a methyl group, an ethyl group, or an n-butyl group, and a styrene monomer unit represented by the formula (6) are preferable, and a monomer unit in which $R^1$ in the formula (5) is a methyl group or an ethyl group is more preferable from the viewpoint of improving the dissolution rate.

The content of the hydrophobic monomer unit D in the copolymer (IV) is preferably 20% by mass or more, more preferably 40% by mass or more, and further preferably 45% by mass or more from the viewpoint of the storage stability of the soluble material for three-dimensional modeling and the support material obtained from the soluble material for three-dimensional modeling. The content of the hydrophobic monomer unit D in the copolymer (IV) is preferably 80% by mass or less, more preferably 78% by mass or less, and further preferably 70% by mass or less from the viewpoint of improving the dissolution rate in an alkaline aqueous solution. From the combination of these viewpoints, the content of the hydrophobic monomer unit D in the copolymer (IV) is preferably 20% by mass to 80% by mass, more preferably 40% by mass to 78% by mass, and further preferably 45% by mass to 70% by mass.

The copolymer (IV) may contain monomer units other than the hydrophilic monomer unit D and the hydrophobic monomer unit D as long as the effect of the soluble material for three-dimensional modeling according to the present embodiment is not impaired. Examples of the monomer units other than the hydrophilic monomer unit D and the hydrophobic monomer unit D include one or more monomer units selected from the group consisting of a monomer unit represented by the formula (1), a monomer unit represented by the formula (2), a monomer unit represented by the formula (3), a monomer unit represented by the formula (7), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

The glass transition temperature of each of the copolymers (I) to (IV) is preferably 50° C. or higher, more preferably 60° C. or higher, further preferably 70° C. or higher, further more preferably 85° C. or higher, and further more preferably 90° C. or higher from the viewpoint of the modeling properties by the 3D printer. The glass transition temperature of each of the copolymers (I) to (IV) is preferably 200° C. or lower, more preferably 180° C. or lower, further preferably 160° C. or lower, further more preferably 140° C. or lower, and further more preferably 130° C. or lower from the same viewpoint.

The weight average molecular weight of each of the copolymers (I) to (IV) is preferably 20,000 or more, more preferably 50,000 or more, and further preferably 70,000 or more from the viewpoint of the modeling properties by the 3D printer. The weight average molecular weight of each of the copolymers (I) to (IV) is preferably 500,000 or less, more preferably 400,000 or less, further preferably 300,000 or less, further more preferably 250,000 or less, further more preferably 200,000 or less, and further more preferably 150,000 or less from the viewpoints of improving the dissolution rate in an alkaline aqueous solution and the modeling properties by the 3D printer. From the combination of these viewpoints, the weight average molecular weight of each of the copolymers (I) to (IV) is preferably 20,000 to 500,000, more preferably 20,000 to 400,000, further preferably 50,000 to 300,000, furthermore preferably 70,000 to 250,000, further more preferably 70,000 to 200,000, and furthermore preferably 70,000 to 150,000. In the present description, the weight average molecular weight is measured by the method described in the examples.

The total content of the copolymers (I) to (IV) in the soluble material for three-dimensional modeling is preferably 30% by mass or more, more preferably 50% by mass or more, further preferably 60% by mass or more, further more preferably 70% by mass or more, and further more preferably 80% by mass or more from the viewpoint of improving the dissolution rate in an alkaline aqueous solution. The total content of the copolymers (I) to (IV) in the soluble material for three-dimensional modeling is preferably 98% by mass or less, more preferably 95% by mass or less, and further preferably 90% by mass or less from the same viewpoint. From the combination of these viewpoints, the total content of the copolymers (I) to (IV) in the soluble material for three-dimensional modeling is preferably 30% by mass to 98% by mass, more preferably 50% by mass to 98% by mass, further preferably 60% by mass to 98% by mass, further more preferably 70% by mass to 95% by mass, and further more preferably 80% by mass to 90% by mass.

In the case in which the polymer contains the copolymer A, the soluble material for three-dimensional modeling may contain a polymer other than the copolymer A as long as the effect of the soluble material for three-dimensional modeling according to the present embodiment is not impaired. Examples of the polymer other than the copolymer A include the polymer B; cellulose derivatives such as carboxymethyl cellulose and hydroxyethyl cellulose; water-soluble polymers such as starch; a polyether ester and a polyether ester amide that are each an elastomer consisting of hard segments and soft segments; a graft polymer obtained by grafting a hydrophobic rubber with a polymer such as polyacrylic acid having a hydrophilic group; a graft polymer obtained by grafting silicone with polyoxazoline; hydrophilic thermoplastic elastomers such as an ionic elastomer; a styrene-butadiene copolymer; and water-insoluble polymers such as a thermoplastic elastomer.

In the case in which the soluble material for three-dimensional modeling contains a polymer other than the copolymer A, both of the SP value of the copolymer A and the SP value of the polymer other than the copolymer A are preferably 8 or more, more preferably 8.5 or more, and further preferably 9 or more from the viewpoint of the compatibility between the copolymer A and the polymer other than the copolymer A. Both of the SP value of the copolymer A and the SP value of the polymer other than copolymer A are preferably 13 or less, more preferably 12 or less, and further preferably 11.5 or less from the same viewpoint. From the combination of these viewpoints, both of the SP value of the copolymer A and the SP value of the polymer other than the copolymer A are preferably 8 to 13, more preferably 8.5 to 12, and further preferably 9 to 11.5. In the present description, the SP value means an amount defied by the following formula:

$$\text{SP value} = (\Delta E/V)^{1/2} (\text{cal}^{1/2}\ \text{cm}^{-3/2})$$

wherein $\Delta E$ is a cohesive energy and $V$ is a molecular volume, and the SP value can be calculated using a Fedors' method described on page 48 of "Basic Science of Coating" written by Yuji Harasaki, published by Maki Shoten in 1988.

The support material obtained from the soluble material for three-dimensional modeling containing the copolymer A as a material has a large dissolution rate in an alkaline aqueous solution, and can be promptly removed from the precursor of the three-dimensional object, and damage to the three-dimensional object can be suppressed. The reason why the soluble material for three-dimensional modeling exhibits such an effect is not clear; however, it is presumed as below.

The copolymers (I) to (III) contained in the soluble material for three-dimensional modeling according to the present embodiment each have at least one member selected from the group consisting of acrylic acid, itaconic acid, and maleic acid (fumaric acid) as a hydrophilic monomer unit. It is believed that the affinity to water increases, diffusion of the alkali to the surface/inside of the polymer increases, and the solubility of the copolymer in the alkaline aqueous solution can be improved if these hydrophilic monomer units are incorporated in the polymer. In addition, the hydrophobic monomer unit tends to be segregated on the surface of the support material because the surface forms an interface with air. Accordingly, it is believed that more hydrophobic monomer units are segregated on the surface of the copolymer containing the hydrophobic monomer units and the hydrophilic monomer units where the hydrophobic monomer units are connected to each other. Accordingly, it is believed that the hydrophilic monomer units and the hydrophobic monomer units are uniformly dispersed like an alternating copolymer to prevent the segregation of the hydrophobic monomer units on the surface of the support material and improve the hydrophilicity of the surface of the support material. The uniformity of the monomer units in the copolymer produced by radical polymerization can be estimated from a radical reactivity ratio between monomers of each type if the copolymer consists of two types of monomers. This reactivity ratio can be calculated from the Alfrey-Price equation (Kagakudojin, Takayuki Otsu, et al., "Experimental Technique of Polymer Synthesis," 1972, Eighth Issue, pp. 192-193) using Q-e values (Wiley, J. Brandrup, et al., Polymer Handbook, Fourth Edition, Volume 1, pp. 11309-11319) which are values inherent in a monomer and representing a conjugate property and an electron density of a monomer. The ratio ($r_1 = k_{11}/k_{12}$) of a rate constant ($k_{11}$) for polymerization between the hydrophilic monomers to a rate constant ($k_{12}$) for polymerization of the hydrophobic monomers (alkyl methacrylate) after the hydrophilic monomers is acrylic acid (0.58 to 0.78)>itaconic acid (0.39 to 0.49)>maleic acid (anhydride) (about 0). The smaller this value is, the hydrophilic monomer radical more easily reacts with the hydrophobic monomer, and the higher the probability of generating a polymer in which the hydrophilic monomer has a uniform distribution close to that of an alternating copolymer. From these viewpoints, the selected hydrophilic monomer and hydrophobic monomer are radically polymerized to uniformly disperse the hydrophilic monomer unit in the copolymer in the hydrophobic monomer unit like an alternating copolymer, prevent the segregation of the hydrophobic monomer units on the surface of the support material, and improve the hydrophilicity of the surface of the support material. It is believed that the hydrophilic monomer units and the hydrophobic monomer units are uniformly dispersed in the copolymers (I) to (III), the segregation of the hydrophobic monomer units on the surface of the support material is prevented, and the hydrophilicity of the surface of the support material can be improved because the combination of the hydrophilic monomer unit and the hydrophobic monomer unit in the copolymers (I) to (III) contained in the soluble material for three-dimensional modeling according to the present embodiment has a small rate constant. On the other hand, the copolymers (II) and (III) containing itaconic acid having a smaller $r_1$ and maleic acid (anhydride) each have a structure with a higher alternating copolymerization property than that of acrylic acid, a chain of the hydrophilic units sandwiched between the hydrophobic monomer units tends to be shorter than that of acrylic acid, and a chain of the hydrophobic monomer units tends to be longer. Accordingly, the hydrophilic unit in the copolymers (II) and (III) can be easily influenced by the hydrophobic unit, and it is believed that it becomes difficult for water to approach the hydrophilic unit as the hydrophobicity of the hydrophobic unit becomes higher, and the dissolution rate decreases. Accordingly, it is believed that the support material obtained using the soluble material for three-dimensional modeling of the present embodiment containing the copolymers (I) to (III) as a material is suitable for the manufacture of a three-dimensional object in an FDM system, the support material has a larger dissolution rate in an alkaline aqueous solution, the support material can be promptly removed from the precursor of the three-dimensional object, and damage to the three-dimensional object can be suppressed or reduced.

[Polymer B]

The polymer B is preferably at least one member selected from the group consisting of polyvinyl alcohol, poly(2-ethyl-2-oxazoline), polyethylene glycol, an ethylene glycol propylene glycol copolymer, a sulfonate, a carboxylate, water-soluble polyester and/or polyamide in which a polyethylene oxide unit is introduced, polymethyl vinyl ether, polystyrene sulfonate, more preferably at least one member selected from the group consisting of polyvinyl alcohol and poly(2-ethyl-2-oxazoline), and further preferably polyvinyl alcohol from the viewpoints of suppressing foaming and manufacturing a three-dimensional object with high accuracy, and the modeling properties by the 3D printer.

The EO mol % of the ethylene glycol propylene glycol copolymer (EO/PO) is preferably 50 mol % or more, and more preferably 60 mol % or more from the viewpoints of improving the dissolution rate in water or an alkaline aqueous solution and the modeling properties by the 3D printer. The EO mol % of the ethylene glycol propylene glycol copolymer (EO/PO) is preferably 90 mol % or less, and more preferably 80 mol % or less from the viewpoint of the modeling properties by the 3D printer. From the combination of these viewpoints, the EO mol % of the ethylene glycol propylene glycol copolymer (EO/PO) is preferably 50 mol % to 90 mol %, and more preferably 60 mol % to 80 mol %.

The glass transition temperature of the polymer B is preferably 60° C. or higher, more preferably 70° C. or higher, and further preferably 75° C. or higher from the viewpoint of the modeling properties by the 3D printer. The glass transition temperature of the polymer B is preferably 160° C. or lower, and more preferably 140° C. or lower from the same viewpoint.

The weight average molecular weight of the polymer B is preferably 20,000 or more, more preferably 50,000 or more, and further preferably 70,000 or more from the viewpoint of the modeling properties by the 3D printer. The weight average molecular weight of the polymer B is preferably 300,000 or less, more preferably 250,000 or less, and further preferably 230,000 or less from the viewpoints of improving the dissolution rate in an alkaline aqueous solution and the modeling properties by the 3D printer. From the combination of these viewpoints, the weight average molecular weight of the polymer B is preferably 20,000 to 300,000, more preferably 50,000 to 250,000, and further preferably 70,000 to 230,000.

The polymer B may contain monomer units other than the hydrophilic monomer unit and the hydrophobic monomer unit as long as the effect of the present embodiment is not impaired. Examples of the monomer units other than the hydrophilic monomer unit and the hydrophobic monomer unit include one or more monomer units selected from the group consisting of monomer units represented by the formulae (1) to (7), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

The content of the polymer B in the soluble material for three-dimensional modeling is preferably 30% by mass or more, more preferably 50% by mass or more, further preferably 60% by mass or more, further more preferably 70% by mass or more, and further more preferably 80% by mass or more from the viewpoint of improving the dissolution rate in an alkaline aqueous solution. The content of the polymer B in the soluble material for three-dimensional modeling is preferably 98% by mass or less, more preferably 95% by mass or less, and further preferably 90% by mass or less from the same viewpoint. From the combination of these viewpoints, the content of the polymer B in the soluble material for three-dimensional modeling is preferably 30% by mass to 98% by mass, more preferably 50% by mass to 98% by mass, further preferably 60% by mass to 98% by mass, further more preferably 70% by mass to 95% by mass, and further more preferably 80% by mass to 90% by mass.

In the case in which the polymer contains the polymer B, the soluble material for three-dimensional modeling may contain a polymer other than the polymer B as long as the effect of the soluble material for three-dimensional modeling according to the present embodiment is not impaired. Examples of the polymer other than the polymer B include the copolymer A; cellulose derivatives such as carboxymethyl cellulose and hydroxyethyl cellulose; water-soluble polymers such as starch; a polyether ester and a polyether ester amide that are each an elastomer consisting of a hard segment and a soft segment; a graft polymer obtained by grafting a hydrophobic rubber with a polymer such as polyacrylic acid having a hydrophilic group; a graft polymer obtained by grafting silicone with polyoxazoline; hydrophilic thermoplastic elastomers such as an ionic elastomer; a styrene-butadiene copolymer; and water-insoluble polymers such as a thermoplastic elastomer.

In the case in which the soluble material for three-dimensional modeling contains a polymer other than the polymer B, both of the SP value of the polymer B and the SP value of the polymer other than the polymer B are preferably 8 or more, more preferably 8.5 or more, and further preferably 9 or more from the viewpoint of the compatibility between the polymer B and the polymer other than the polymer B. Both of the SP value of the polymer B and the SP value of the polymer other than the polymer B are preferably 13 or less, more preferably 12 or less, and further preferably 11.5 or less from the same viewpoint. From the combination of these viewpoints, both of the SP value of the polymer B and the SP value of the polymer other than the polymer B are preferably 8 to 13, more preferably 8.5 to 12, and further preferably 9 to 11.5.

[Plasticizer]

The soluble material for three-dimensional modeling preferably contains a plasticizer from the viewpoints of reducing the viscosity to make modeling easy during modeling with a 3D printer and imparting toughness to the support material.

The plasticizer is preferably at least one member selected from the group consisting of a polyester-based plasticizer, a polyhydric alcohol ester-based plasticizer, a polycarboxylic acid ester-based plasticizer, and a phosphoric acid ester-based plasticizer from the viewpoints of reducing the viscosity to make modeling easy during modeling with a 3D printer and imparting toughness to the support material. Examples of the plasticizer are described in the paragraph 0036 of JP-T-2008-507619. Particularly, examples of the polycarboxylic acid ester-based plasticizer include mono-, di-, or tri-esters of polyvalent carboxylic acid and mono-alcohol preferably having 1 to 12 carbon atoms, more preferably having 1 to 6 carbon atoms, and further preferably having 1 to 4 carbon atoms, or a (poly)oxyalkylene adduct thereof. Examples of the polycarboxylic acid include succinic acid, adipic acid, sebacic acid, terephthalic acid, and isophthalic acid. Examples of the mono-alcohol include methanol, ethanol, 1-propanol, and 1-butanol. Specific examples include an ester of succinic acid and polyethylene glycol monomethyl ether in which the average addition molar number of ethylene oxide is 2 to 3 (addition of 2 to 3 mol of ethylene oxide per 1 mol of hydroxyl group), a diester compound of succinic acid and triethylene glycol monomethyl ether, and a diester of succinic acid and 1,3-propanediol. More specific examples include DAIFATTY-101 (a 1:1 mixed ester of adipic acid methyl diglycol/benzyl alcohol, manufactured by Daihachi Chemical Industry Co., Ltd., sp value 10.0) and ECOLA A1010 (succinic acid methyl triglycol diester, manufactured by Kao Corporation, sp value 9.57).

Examples of the phosphoric acid ester-based plasticizer include mono-, di-, or tri-esters of phosphoric acid and the above-described mono-alcohol or a (poly)oxyalkylene adduct thereof. Specific examples include tributyl phosphate, tri-2-ethylhexyl phosphate, trioctyl phosphate, triphenyl phosphate, diphenyl-2-ethylhexyl phosphate, tricresyl phosphate, and tris(ethoxyethoxyethyl)phosphate.

The content of the plasticizer in the soluble material for three-dimensional modeling is preferably 1 part by mass or more, more preferably 2 parts by mass or more, and further preferably 3 parts by mass or more with respect to 100 parts by mass of the polymer in the soluble material for three-dimensional modeling from the viewpoints of reducing the viscosity to make modeling easy during modeling with a 3D printer and imparting toughness to the support material. The content of the plasticizer in the soluble material for three-dimensional modeling is preferably 30 parts by mass or less, more preferably 25 parts by mass or less, and further preferably 20 parts by mass or less with respect to 100 parts by mass of the polymer in the soluble material for three-dimensional modeling from the viewpoint of the modeling properties by the 3D printer. From the combination of these viewpoints, the content of the plasticizer in the soluble material for three-dimensional modeling is preferably 1 part by mass to 30 parts by mass, more preferably 2 parts by mass to 25 parts by mass, and further preferably 3 parts by mass to 20 parts by mass with respect to 100 parts by mass of the polymer in the soluble material for three-dimensional modeling.

In the case in which the soluble material for three-dimensional modeling contains the plasticizer, all of the SP values of the copolymer A and the polymer B and the SP value of the plasticizer are preferably 8 or more, more preferably 8.5 or more, and further preferably 9 or more from the viewpoint of the compatibility among the copolymer A, the polymer B, and the plasticizer. All of the SP values of the copolymer A and the polymer B and the SP value of the plasticizer are preferably 13 or less, more preferably 12 or less, and further preferably 11.5 or less from the same viewpoint. From the combination of these viewpoints, all of the SP values of the copolymer A and the polymer B and the SP value of the plasticizer are preferably 8 to 13, more preferably 8.5 to 12, and further preferably 9 to 11.5.

The shape of the soluble material for three-dimensional modeling is not particularly limited; examples include a pellet shape, a powder shape, and a filament shape. However, the filament shape is preferable from the viewpoint of the modeling properties by the 3D printer.

The diameter of the filament is preferably 0.5 mm or more, and more preferably 1.0 mm or more from the viewpoints of the modeling properties by the 3D printer and improving the accuracy of the three-dimensional object. The diameter of the filament is preferably 3.0 mm or less, more preferably 2.0 mm or less, and further preferably 1.8 mm or less from the viewpoints of the modeling properties by the 3D printer and improving the accuracy of the three-dimensional object.

The glass transition temperature of the soluble material for three-dimensional modeling is preferably 60° C. or higher, more preferably 70° C. or higher, and further preferably 75° C. or higher from the viewpoint of the modeling properties by the 3D printer. The glass transition temperature of the soluble material for three-dimensional modeling is preferably 200° C. or lower, more preferably 160° C. or lower, and further preferably 140° C. or lower from the same viewpoint.

The soluble material for three-dimensional modeling may contain other components other than the fibrous filler and the flat filler as long as the effect of the present embodiment is not impaired. Examples of the other components include fillers such as calcium carbonate, magnesium carbonate, graphite, carbon black, wollastonite, mica, alumina, silica, kaolin, whisker, and silicon carbide.

The soluble material for three-dimensional modeling can be manufactured by a known method. Examples of the method include a method of melting and kneading the polymer and the filler, a method of dispersing the filler in a polymer solution and a dispersion and precipitating the material by drying or using a poor solvent for the polymer, and a method of adding and dispersing the filler in the monomer (solution, dispersion) during the synthesis of the polymer (polymerization).

<Method for Manufacturing Three-Dimensional Object>

The method for manufacturing a three-dimensional object of the present embodiment is a method for manufacturing a three-dimensional object by fused deposition modeling, and includes a step of obtaining a precursor of a three-dimensional object containing the three-dimensional object and a support material, and a support material removing step of making the precursor of the three-dimensional object contact an alkaline aqueous solution and/or water to remove the support material. The material of the support material is the soluble material for three-dimensional modeling. The method for manufacturing a three-dimensional object can suppress foaming and a decrease of the accuracy of a three-dimensional object even when being used in manufacture of a three-dimensional object with a 3D printer after the soluble material for three-dimensional modeling is exposed to high humidity. The reason why the method for manufacturing a three-dimensional object exhibits such an effect is not clear; however, the reason is presumably the same as the reason why the soluble material for three-dimensional modeling exhibits the effect.

[Step of Obtaining Precursor of Three-Dimensional Object Containing Three-Dimensional Object and Support Material]

As the step of obtaining a precursor of a three-dimensional object containing the three-dimensional object and the support material, a step of obtaining a precursor of a three-dimensional object containing the three-dimensional object and the support material of a known method for manufacturing a three-dimensional object with a fused deposition modeling type 3D printer can be used, except that the material of the support material is the soluble material for three-dimensional modeling.

For the modeling material that is a material of the three-dimensional object, any material can be used without particular limitation as long as the material is a resin that is used as a modeling material in the conventional method for manufacturing a three-dimensional object of an FDM system. Examples of the modeling material include thermoplastic resins such as an ABS resin, a polylactic resin, a polycarbonate resin, and a polyphenylsulfone resin, and among these, an ABS resin and/or a polylactic resin are more preferable, and an ABS resin is further preferable from the viewpoint of the modeling properties by the 3D printer.

[Support Material Removing Step of Making Precursor of Three-Dimensional Object Contact Alkaline Aqueous Solution and/or Water to Remove Support Material]

The precursor of the three-dimensional object is made to contact an alkaline aqueous solution and/or water to remove the support material in the support material removing step. The method of making the precursor of the three-dimensional object contact an alkaline aqueous solution is preferably a method of soaking the precursor of the three-dimensional object in an alkaline aqueous solution from the viewpoints of cost and ease of work. From the viewpoint of improving removability of the support material, the precursor of the three-dimensional object is irradiated with ultrasonic waves while being soaked in the alkaline aqueous solution to promote dissolution of the support material.

[Alkaline Aqueous Solution]

In the case in which the soluble material for three-dimensional modeling contains the copolymer A, carboxylic acid is introduced. Thus, the support material obtained by modeling the soluble material for three-dimensional modeling is neutralized with an alkaline agent to be dissolved in an alkaline aqueous solution.

The alkaline aqueous solution is an aqueous solution in which an alkaline agent is dissolved. The alkaline agent is preferably at least one member selected from the group consisting of sodium hydroxide, potassium hydroxide, sodium carbonate, sodium hydrogen carbonate, ammonia, and amine, and more preferably at least one member selected from the group consisting of sodium hydroxide, potassium hydroxide, and sodium carbonate from the viewpoint of solubility of the support material.

The pH of the alkaline aqueous solution is preferably 10 or more, and more preferably 11 or more from the viewpoint of solubility of the support material. The pH of the alkaline aqueous solution is preferably 14 or less, and more preferably 13 or less from the viewpoint of suppressing or reducing damage to the modeling material. From the combination of these viewpoints, the pH of the alkaline aqueous solution is preferably 10 to 14, more preferably 10 to 13, and further preferably 11 to 13.

The alkaline aqueous solution and/or water may further contain other components as long as the solubility of the support material is not impaired. Examples of the other components include water-soluble polymers such as sodium polyacrylate.

The amount of the alkaline aqueous solution and/or water used is preferably 10 mass times or more, and more preferably 20 mass times or more the support material from the viewpoint of the solubility of the support material. The amount of the alkaline aqueous solution used is preferably 10,000 mass times or less, more preferably 5,000 mass times or less, further preferably 1,000 mass times or less, and further preferably 100 mass times or less the support material from the viewpoint of workability.

The period of contact between the soluble material for three-dimensional modeling and the alkaline aqueous solution and/or water is preferably 5 minutes or more from the viewpoint of removability of the support material. The period of contact between the soluble material for three-dimensional modeling and the alkaline aqueous solution is preferably 180 minutes or less, more preferably 120 minutes or less, and further preferably 90 minutes or less from the viewpoint of reducing damage to the three-dimensional object caused by soaking the three-dimensional object in the alkaline aqueous solution for a long period of time. From the combination of these viewpoints, the period of contact between the soluble material for three-dimensional modeling and the alkaline aqueous solution is preferably 5 minutes to 180 minutes, more preferably 5 minutes to 120 minutes, and further preferably 5 minutes to 90 minutes.

<Support Material>

The support material of the present embodiment is a support material that supports a three-dimensional object when manufacturing the three-dimensional object by a fused deposition modeling type 3D printer, containing at least one polymer and at least one filler. The filler is dispersed in the soluble material for three-dimensional modeling. In the support material, the filler is a fibrous filler having a fiber length of 0.1 μm to 1,000 μm and a fiber diameter of 0.001 μm to 20 μm and/or a flat filler having a particle size of 0.1 μm to 20 μm and a thickness of 0.01 μm to 10 μm, and the content of the filler is 0.01 part by mass to 200 parts by mass with respect to 100 parts by mass of the polymer. The support material can suppress foaming and a decrease of the accuracy of a three-dimensional object even when being used in manufacture of a three-dimensional object with a 3D printer after being exposed to high humidity. The reason why the support material exhibits such an effect is not clear; however, the reason is presumably the same as the reason why the soluble material for three-dimensional modeling exhibits the effect. The components contained in the support material are preferably the same as the components contained in the soluble material for three-dimensional modeling.

With respect to the above-described embodiment, the present description further discloses the following composition and manufacturing method.

<1> A soluble material for three-dimensional modeling that is used as a material of a support material that supports a three-dimensional object when manufacturing the three-dimensional object with a fused deposition modeling type 3D printer, wherein the soluble material contains at least one polymer and at least one filler, the filler is a fibrous filler having a fiber length of 0.02 µm to 1,000 µm and a fiber diameter of 0.0001 µm to 20 µm and/or a flat filler having a particle size of 0.1 µm to 20 µm and a thickness of 0.01 µm to 10 µm, and the content of the filler is 0.01 part by mass to 200 parts by mass with respect to 100 parts by mass of the polymer.

<2> The soluble material for three-dimensional modeling according to <1>, in which the fiber length of the fibrous filler is 0.02 µm or more, preferably 0.1 µm or more, more preferably 0.2 µm or more, 1,000 µm or less, preferably 500 µm or less, more preferably 100 µm or less, further preferably 50 µm or less, further more preferably 10 µm or less, further more preferably 5 µm or less, 0.02 µm to 1,000 µm, preferably 0.1 µm to 500 µm, more preferably 0.2 µm to 100 µm, further preferably 0.2 µm to 50 µm, further more preferably 0.2 µm to 10 µm, and further more preferably 0.2 µm to 5 µm.

<3> The soluble material for three-dimensional modeling according to <1> or <2>, in which the fiber diameter of the fibrous filler is 0.0001 µm or more, preferably 0.001 µm or more, 20 µm or less, preferably 10 µm or less, more preferably 0.1 µm or less, further preferably 0.05 µm or less, further more preferably 0.01 µm or less, 0.0001 µm to 20 µm, preferably 0.001 µm to 10 µm, more preferably 0.001 µm to 0.1 µm, further preferably 0.001 µm to 0.05 µm, and further more preferably 0.001 µm to 0.01 µm.

<4> The soluble material for three-dimensional modeling according to any one of <1> to <3>, in which the aspect ratio of the fibrous filler is preferably 20 or more, more preferably 30 or more, further preferably 40 or more, further more preferably 50 or more, further more preferably 70 or more, preferably 10,000 or less, more preferably 5,000 or less, further preferably 1,000 or less, further more preferably 500 or less, further more preferably 300 or less, preferably 20 to 10,000, more preferably 30 to 5,000, further preferably 40 to 1,000, further more preferably 50 to 500, and further more preferably 70 to 300.

<5> The soluble material for three-dimensional modeling according to any one of <1> to <4>, in which the particle size of the flat filler is 0.1 µm or more, preferably 0.2 µm or more, more preferably 0.5 µm or more, further preferably 1 µm or more, 20 µm or less, preferably 15 µm or less, more preferably 10 µm or less, further preferably 8 µm or less, preferably 0.1 µm to 20 µm, more preferably 0.2 µm to 15 µm, more preferably 0.5 µm to 10 µm, and further preferably 1 µm to 8 µm.

<6> The soluble material for three-dimensional modeling according to any one of <1> to <5>, in which the thickness of the flat filler is 0.01 µm or more, preferably 0.02 µm or more, more preferably 0.05 µm or more, further preferably 0.1 µm or more, 10 µm or less, preferably 7 µm or less, more preferably 5 µm or less, further preferably 1 µm or less, 0.01 µm to 10 µm, more preferably 0.02 µm to 7 µm, further preferably 0.05 µm to 5 µm, and further more preferably 0.1 µm to 1 µm.

<7> The soluble material for three-dimensional modeling according to any one of <1> to <6>, in which the compounding amount of the filler is 0.01 part by mass or more, preferably 1 part by mass or more, more preferably 2 parts by mass or more, further preferably 5 parts by mass or more, 200 parts by mass or less, preferably 100 parts by mass or less, more preferably 50 parts by mass or less, further preferably 40 parts by mass or less, further more preferably 35 parts by mass or less, further more preferably 30 parts by mass or less, 0.01 part by mass to 200 parts by mass, preferably 0.01 part by mass to 100 parts by mass, more preferably 0.01 part by mass to 50 parts by mass, further preferably 1 part by mass to 40 parts by mass, further more preferably 2 parts by mass to 35 parts by mass, and further more preferably 5 parts by mass to 30 parts by mass with respect to 100 parts by mass of the polymer.

<8> The soluble material for three-dimensional modeling according to any one of <1> to <7>, in which the filler is at least one member selected from the group consisting of glass, cellulose, a clay mineral, and a modified substance thereof, and more preferably cellulose.

<9> The soluble material for three-dimensional modeling according to <8>, in which the glass is preferably glass fibers and/or glass flakes, and more preferably glass fibers.

<10> The soluble material for three-dimensional modeling according to <8> or <9>, in which the cellulose is preferably at least one member selected from the group consisting of cellulose fibers, cellulose nanofibers obtained by mechanically refining cellulose fibers, and cellulose single nanofibers that are cellulose obtained by an action of an N-oxyl compound, more preferably at least one member selected from the group consisting of cellulose nanofibers and cellulose single nanofibers, and further preferably cellulose single nanofibers.

<11> The soluble material for three-dimensional modeling according to <10>, in which the content of carboxyl groups in the cellulose single nanofibers is 0.1 mmol/g or more, preferably 0.4 mmol/g or more, and more preferably 0.8 mmol/g or more, and preferably 3 mmol/g or less, more preferably 2.5 mmol/g or less, and further preferably 2.0 mmol/g or less.

<12> The soluble material for three-dimensional modeling according to any one of <8> to <11>, in which the clay mineral is preferably at least one member selected from the group consisting of talc, mica, synthetic mica, and clay, more preferably talc and/or mica, and further preferably talc.

<13> The soluble material for three-dimensional modeling according to any one of <8> to <12>, in which the modified substance is a substance having a surface modified with at least one member selected from the group consisting of a hydrocarbon group, fluorine, perfluoroalkyl, silane, polymer graft, and a surfactant, preferably a substance having a surface modified with a hydrocarbon group and/or silane, and more preferably a substance having a surface modified with a hydrocarbon group.

<14> The soluble material for three-dimensional modeling according to any one of <8> to <13>, in which the modified substance is modified cellulose.

<15> The soluble material for three-dimensional modeling according to any one of <9> to <14>, in which the fiber length of the glass fibers and a modified substance thereof is 0.02 µm or more, preferably 0.1 µm or more, more preferably 0.2 µm or more, further preferably 5 µm or more, further more preferably 10 µm or more, 1,000 µm or less, preferably 700 µm or less, more preferably 500 µm or less, further preferably 100 µm or less, further preferably 50 µm or less, 0.02 µm to 1,000 µm, preferably 0.1 µm to 700 µm, more preferably 0.2 µm to 500 µm, further preferably 5 µm to 100 µm, and further more preferably 10 µm to 50 µm.

<16> The soluble material for three-dimensional modeling according to any one of <9> to <15>, in which the fiber diameter of the glass fibers and a modified substance thereof is preferably 0.01 µm or more, more preferably 0.1 µm or more, further preferably 1 µm or more, preferably 20 µm or less, more preferably 10 µm or less, further preferably 5 µm or less, preferably 0.01 µm to 20 µm, more preferably 0.1 µm to 10 µm, and further preferably 1 µm to 5 µm.

<17> The soluble material for three-dimensional modeling according to any one of <9> to <16>, in which the aspect ratio of the glass fibers and a modified substance thereof is preferably 20 or more, more preferably 30 or more, further preferably 40 or more, further more preferably 50 or more, further more preferably 70 or more, preferably 10,000 or less, more preferably 5,000 or less, further preferably 1,000 or less, further more preferably 500 or less, further more preferably 300 or less, preferably 20 to 10,000, more preferably 30 to 5,000, further preferably 40 to 1,000, further more preferably 50 to 500, and further more preferably 70 to 300.

<18> The soluble material for three-dimensional modeling according to any one of <10> to <17>, in which the fiber length of the cellulose nanofibers, the cellulose single nanofibers, and a modified substance thereof is 0.02 μm or more, preferably 0.1 μm or more, more preferably 0.2 μm or more, 1,000 μm or less, preferably 500 μm or less, more preferably 100 μm or less, further preferably 50 μm or less, further more preferably 10 μm or less, 0.02 μm to 1,000 μm, preferably 0.1 μm to 500 μm, more preferably 0.2 μm to 100 μm, further preferably 0.2 μm to 50 μm, and further more preferably 0.2 μm to 10 μm.

<19> The soluble material for three-dimensional modeling according to any one of <10> to <18>, in which the fiber diameter of the cellulose nanofibers, the cellulose single nanofibers, and a modified substance thereof is 0.0001 μm or more, preferably 0.001 μm or more, 20 μm or less, preferably 10 μm or less, more preferably 0.1 μm or less, further preferably 0.05 μm or less, further more preferably 0.01 μm or less, 0.0001 μm to 20 μm, preferably 0.001 μm to 10 μm, more preferably 0.001 μm to 0.1 μm, further preferably 0.001 μm to 0.05 μm, and further more preferably 0.001 μm to 0.01 μm.

<20> The soluble material for three-dimensional modeling according to any one of <10> to <19>, in which the aspect ratio of the cellulose nanofibers, the cellulose single nanofibers, and a modified substance thereof is preferably 20 or more, more preferably 30 or more, further preferably 40 or more, further more preferably 50 or more, further more preferably 70 or more, preferably 10,000 or less, more preferably 5,000 or less, further preferably 1,000 or less, further more preferably 500 or less, further more preferably 300 or less, preferably 20 to 10,000, more preferably 30 to 5,000, further preferably 40 to 1,000, further more preferably 50 to 500, and further more preferably 70 to 300.

<21> The soluble material for three-dimensional modeling according to any one of <12> to <20>, in which the particle size of the talc, mica, and a modified substance thereof is 0.1 μm or more, preferably 0.2 μm or more, more preferably 0.5 μm or more, further preferably 1 μm or more, 20 μm or less, preferably 15 μm or less, more preferably 10 μm or less, further preferably 8 μm or less, preferably 0.1 μm to 20 μm, more preferably 0.2 μm to 15 μm, more preferably 0.5 μm to 10 μm, and further preferably 1 μm to 8 μm.

<22> The soluble material for three-dimensional modeling according to any one of <12> to <21>, in which the thickness of the talc, mica, and a modified substance thereof is 0.01 μm or more, preferably 0.02 μm or more, more preferably 0.05 μm or more, further preferably 0.1 μm or more, preferably 10 μm or less, more preferably 7 μm or less, further preferably 5 μm or less, further more preferably 1 μm or less, further more preferably 0.5 μm or less, 0.01 μm to 10 μm, more preferably 0.02 μm to 7 μm, further preferably 0.05 μm to 5 μm, further preferably 0.1 μm to 1 μm, and further more preferably 0.1 μm to 0.5 μm.

<23> The soluble material for three-dimensional modeling according to any one of <1> to <22>, in which the polymer contains a copolymer A having a hydrophilic monomer unit and a hydrophobic monomer unit, or at least one polymer B selected from the group consisting of polyvinyl alcohol, poly(2-ethyl-2-oxazoline), polyethylene glycol, an ethylene glycol propylene glycol copolymer, a sulfonate, a carboxylate, and water-soluble polyester and/or polyamide in which a polyethylene oxide unit is introduced, and the copolymer A is at least one member selected from the group consisting of the following (I) to (IV):

(I) Copolymer having a hydrophilic monomer unit represented by the formula (1) and at least one member selected from the group consisting of hydrophobic monomer units represented by the formulae (5) to (7), in which the content of the hydrophilic monomer unit in the copolymer is 20% by mass to 80% by mass;

(II) Copolymer having a hydrophilic monomer unit represented by the formula (2) and at least one member selected from the group consisting of a hydrophobic monomer unit represented by the formula (8), in which the content of the hydrophilic monomer unit in the copolymer is 20% by mass to 80% by mass;

(III) Copolymer having a hydrophilic monomer unit represented by the formula (3) and a hydrophobic monomer unit represented by the formula (9), in which the content of the hydrophobic monomer unit in the copolymer is 20% by mass to 80% by mass; and (IV) Copolymer having a hydrophilic monomer unit represented by the formula (4) and at least one member selected from the group consisting of hydrophobic monomer units represented by the formulae (5) and (6), in which the content of the hydrophilic monomer unit in the copolymer is 20% by mass to 80% by mass.

<24> The soluble material for three-dimensional modeling according to any one of <1> to <23>, in which the content of the hydrophilic monomer unit A represented by the formula (1) in the copolymer (I) is 20% by mass or more, preferably 22% by mass or more, more preferably 30% by mass or more, 80% by mass or less, preferably 60% by mass or less, more preferably 55% by mass or less, 20% by mass to 80% by mass, preferably 22% by mass to 60% by mass, and more preferably 30% by mass to 55% by mass.

<25> The soluble material for three-dimensional modeling according to <23> or <24>, in which in the formula (5), $R^1$ is preferably at least one member selected from the group consisting of a methyl group, an ethyl group, an n-propyl group, an i-propyl group, an n-butyl group, an i-butyl group, a t-butyl group, and a 2-ethylhexyl group, more preferably at least one member selected from the group consisting of a methyl group, an ethyl group, and an n-butyl group, and further preferably a methyl group and/or an ethyl group.

<26> The soluble material for three-dimensional modeling according to any one of <23> to <25>, in which the hydrophobic monomer units represented by the formulae (5) to (7) are preferably a monomer unit in which $R^1$ in the formula (5) is a methyl group, an ethyl group, or an n-butyl group and a styrene monomer unit represented by the formula (6), and more preferably a monomer unit in which $R^1$ in the formula (5) is a methyl group or an ethyl group and a styrene monomer unit represented by the formula (6).

<27> The soluble material for three-dimensional modeling according to any one of <23> to <26>, in which the total content of at least one member selected from the group consisting of the hydrophobic monomer units represented by the formulae (5) and (7) in the copolymer (I) is preferably 20% by mass or more, more preferably 30% by mass or more, further preferably 40% by mass or more, further more preferably 45% by mass or more, preferably 80% by mass or less, more preferably 75% by mass or less, further preferably 70% by mass or less, preferably 20% by mass to 80% by mass, more preferably 30% by mass to 80% by mass, more preferably 40% by mass to 75% by mass, and further preferably 45% by mass to 70% by mass.

<28> The soluble material for three-dimensional modeling according to any one of <23> to <27>, in which the content of the hydrophilic monomer unit represented by the formula (2) in the copolymer (II) is 20% by mass or more, preferably 22% by mass or more, more preferably 30% by mass or more, further preferably 35% by mass or more, 80% by mass or less, preferably 60% by mass or less, more preferably 55% by mass or less, further preferably 50% by mass or less, 20% by mass to 80% by mass, preferably 22% by mass to 60% by mass, more preferably 30% by mass to 55% by mass, and further preferably 35% by mass to 50% by mass.

<29> The soluble material for three-dimensional modeling according to any one of <23> to <28>, in which in the formula (8), $R^1$ is at least one member selected from the group consisting of a methyl group and an ethyl group, and among these, $R^1$ is preferably a methyl group from the viewpoint of improving the dissolution rate in an alkaline aqueous solution.

<30> The soluble material for three-dimensional modeling according to any one of <23> to <29>, in which the total content of at least one member selected from the group consisting of the hydrophobic monomer unit represented by the formula (8) in the copolymer (II) is preferably 20% by mass or more, more preferably 40% by mass or more, further preferably 45% by mass or more, further more preferably 50% by mass or more, preferably 80% by mass or less, more preferably 78% by mass or less, further preferably 70% by mass or less, further preferably 65% by mass or less, preferably 20% by mass to 80% by mass, more preferably 40% by mass to 78% by mass, further preferably 45% by mass to 70% by mass, and more preferably 50% by mass to 65% by mass.

<31> The soluble material for three-dimensional modeling according to any one of <23> to <30>, in which the content of the hydrophilic monomer unit represented by the formula (3) in the copolymer (III) is 20% by mass or more, preferably 22% by mass or more, more preferably 30% by mass or more, 80% by mass or less, preferably 60% by mass or less, more preferably 55% by mass or less, further preferably 50% by mass or less, further more preferably 45% by mass or less, 20% by mass to 80% by mass, preferably 22% by mass to 60% by mass, more preferably 30% by mass to 55% by mass, further preferably 30% by mass to 50% by mass, and further more preferably 30% by mass or 45% by mass.

<32> The soluble material for three-dimensional modeling according to any one of <23> to <31>, in which the content of the hydrophobic monomer unit represented by the formula (9) in the copolymer (III) is preferably 20% by mass or more, more preferably 40% by mass or more, further preferably 45% by mass or more, further more preferably 50% by mass or more, further more preferably 55% by mass or more, preferably 80% by mass or less, more preferably 78% by mass or less, further preferably 70% by mass or less, preferably 20% by mass to 80% by mass, more preferably 40% by mass to 78% by mass, further preferably 45% by mass to 70% by mass, further more preferably 50% by mass to 70% by mass, and further more preferably 55% by mass to 70% by mass.

<33> The soluble material for three-dimensional modeling according to any one of <23> to <32>, in which the content of the hydrophilic monomer unit represented by the formula (4) in the copolymer (IV) is 20% by mass or more, preferably 22% by mass or more, more preferably 30% by mass or more, 80% by mass or less, preferably 60% by mass or less, more preferably 55% by mass or less, 20% by mass to 80% by mass, preferably 22% by mass to 60% by mass, and more preferably 30% by mass to 55% by mass.

<34> The soluble material for three-dimensional modeling according to any one of <23> to <33>, in which the hydrophobic monomer units represented by the formulae (5) and (6) are preferably a monomer unit in which $R^1$ in the formula (5) is a methyl group, an ethyl group, or an n-butyl group and a styrene monomer unit represented by the formula (6), and more preferably a monomer unit in which $R^1$ in the formula (5) is a methyl group or an ethyl group.

<35> The soluble material for three-dimensional modeling according to any one of <23> to <34>, in which the total content of at least one member selected from the group consisting of the hydrophobic monomer units represented by the formulae (5) and (6) in the copolymer (IV) is preferably 20% by mass or more, more preferably 40% by mass or more, further preferably 45% by mass or more, preferably 80% by mass or less, more preferably 78% by mass or less, further preferably 70% by mass or less, preferably 20% by mass to 80% by mass, more preferably 40% by mass to 78% by mass, and further preferably 45% by mass to 70% by mass.

<36> The soluble material for three-dimensional modeling according to any one of <23> to <35>, in which the glass transition temperature of each of the copolymers (I) to (IV) is preferably 50° C. or higher, more preferably 60° C. or higher, further preferably 70° C. or higher, further more preferably 75° C. or higher, further more preferably 85° C. or higher, further more preferably 90° C. or higher, preferably 200° C. or lower, more preferably 180° C. or lower, further preferably 160° C. or lower, further more preferably 140° C. or lower, and further more preferably 130° C. or lower.

<37> The soluble material for three-dimensional modeling according to any one of <23> to <36>, in which the weight average molecular weight of each of the copolymers (I) to (IV) is preferably 20,000 or more, more preferably 50,000 or more, further preferably 70,000, preferably 500,000 or less, more preferably 400,000 or less, further preferably 300,000 or less, further more preferably 250,000 or less, further more preferably 200,000 or less, further more preferably 150,000 or less, preferably 20,000 to 500,000, more preferably 20,000 to 400,000, further preferably 50,000 to 300,000, further more preferably 70,000 to 250,000, further more preferably 70,000 to 200,000, and further more preferably 70,000 to 150,000.

<38> The soluble material for three-dimensional modeling according to any one of <23> to <37>, in which the total content of the copolymers (I) to (IV) in the soluble material for three-dimensional modeling is preferably 30% by mass or more, more preferably 50% by mass or more, further preferably 60% by mass or more, further more preferably 70% by mass or more, further more preferably 80% by mass or more, preferably 98% by mass or less, more preferably 95% by mass or less, further preferably 90% by mass or less, preferably 30% by mass to 98% by mass, more preferably 50% by mass to 98% by mass, further preferably 60% by mass to 98% by mass, further more preferably 70% by mass to 95% by mass, and further more preferably 80% by mass to 90% by mass.

<39> The soluble material for three-dimensional modeling according to any one of <23> to <38>, in which the polymer B is preferably at least one member selected from the group consisting of polyvinyl alcohol, poly(2-ethyl-2-oxazoline), polyethylene glycol, an ethylene glycol propylene glycol copolymer, a sulfonate, a carboxylate, water-soluble polyester and/or polyamide in which a polyethylene oxide unit is introduced, polymethyl vinyl ether, and polystyrene sulfonate, more preferably at least one member selected from the group consisting of polyvinyl alcohol and poly(2-ethyl-2-oxazoline), and further preferably polyvinyl alcohol.

<40> The soluble material for three-dimensional modeling according to any one of <23> to <39>, in which the glass transition temperature of the polymer B is preferably 60° C. or higher, more preferably 70° C. or higher, further preferably 75° C. or higher, preferably 160° C. or lower, and more preferably 140° C. or lower.

<41> The soluble material for three-dimensional modeling according to any one of <23> to <40>, in which the weight average molecular weight of the polymer B is preferably 20,000 or more, more preferably 50,000 or more, further preferably 70,000 or more, preferably 300,000 or less, more preferably 250,000 or less, and further preferably 230,000 or less, preferably 20,000 to 300,000, more preferably 50,000 to 250,000, and further preferably 70,000 to 230,000.

<42> The soluble material for three-dimensional modeling according to any one of <23> to <41>, in which the content of the polymer B in the soluble material for three-dimensional modeling is preferably 30% by mass or more, more preferably 50% by mass or more, further preferably 60% by mass or more, further more preferably 70% by mass or more, further more preferably 80% by mass or more, preferably 98% by mass or less, more preferably 95% by mass or less, and further preferably 90% by mass or less, preferably 30% by mass to 98% by mass, more preferably 50% by mass to 98% by mass, further preferably 60% by mass to 98% by mass, further more preferably 70% by mass to 95% by mass, and further more preferably 80% by mass to 90% by mass.

<43> The soluble material for three-dimensional modeling according to any one of <1> to <42>, in which the soluble material for three-dimensional modeling contains a plasticizer.

<44> The soluble material for three-dimensional modeling according to <43>, in which the plasticizer is preferably at least one member selected from the group consisting of a polyester-based plasticizer, a polyhydric alcohol ester-based plasticizer, a polycarboxylic acid ester-based plasticizer, and a phosphoric acid ester-based plasticizer.

<45> The soluble material for three-dimensional modeling according to <43> or <44>, in which the content of the plasticizer in the soluble material for three-dimensional modeling is preferably 1 part by mass or more, more preferably 2 parts by mass or more, further preferably 3 parts by mass or more, preferably 30 parts by mass or less, more preferably 25 parts by mass or less, further preferably 20 parts by mass or less, preferably 1 part by mass to 30 parts by mass, more preferably 2 parts by mass to 25 parts by mass, and further preferably 3 parts by mass to 20 parts by mass with respect to 100 parts by mass of the copolymer in the soluble material for three-dimensional modeling.

<46> The soluble material for three-dimensional modeling according to any one of <43> to <45>, in which the shape of the soluble material for three-dimensional modeling is preferably a pellet shape, a powder shape, or a filament shape, and more preferably a filament shape.

<47> The soluble material for three-dimensional modeling according to <46>, in which the diameter of the filament is preferably 0.5 mm or more, more preferably 1.0 mm or more, preferably 3.0 mm or less, more preferably 2.0 mm or less, and further preferably 1.8 mm or less.

<48> The soluble material for three-dimensional modeling according to any one of <1> to <47>, in which the glass transition temperature of the soluble material for three-dimensional modeling is preferably 60° C. or higher, more preferably 70° C. or higher, further preferably 75° C. or higher, preferably 200° C. or lower, more preferably 160° C. or lower, and further preferably 140° C. or lower.

<49> A method for manufacturing a three-dimensional object by fused deposition modeling, including a step of obtaining a precursor of a three-dimensional object containing the three-dimensional object and a support material, and a support material removing step of making the precursor of the three-dimensional object contact an alkaline aqueous solution and/or water to remove the support material, in which the material of the support material is the soluble material for three-dimensional modeling according to any one of <1> to <48>.

<50> The method for manufacturing a three-dimensional object according to <49>, in which a modeling material as a material for the three-dimensional object is preferably at least one member selected from the group consisting of an ABS resin, a polylactic resin, a polycarbonate resin, and a polyphenylsulfone resin, more preferably an ABS resin and/or a polylactic resin, and further preferably an ABS resin.

<51> The method for manufacturing a three-dimensional object according to <49> or <50>, in which a technique of making the precursor of the three-dimensional object contact the alkaline aqueous solution and/or water in the support material removing step is preferably a technique of soaking the precursor of the three-dimensional object in the alkaline aqueous solution and/or water, and more preferably a method of irradiating the precursor of the three-dimensional object with ultrasonic waves while being soaked in the alkaline aqueous solution and/or water to promote dissolution of the support material.

<52> The method for manufacturing a three-dimensional object according to any one of <49> to <51>, in which the pH of the alkaline aqueous solution is preferably 10 or more, more preferably 11 or more, preferably 14 or less, more preferably 13 or less, preferably 10 to 14, more preferably 10 to 13, and further preferably 11 to 13.

<53> The method for manufacturing a three-dimensional object according to any one of <49> to <52>, in which the period in which the soluble material for three-dimensional modeling is soaked in the alkaline aqueous solution and/or water is preferably 5 minutes or more, preferably 180 minutes or less, more preferably 120 minutes or less, further preferably 90 minutes or less, preferably 5 to 180 minutes, more preferably 5 to 120 minutes, and further preferably 5 to 90 minutes.

<54> A support material that supports a three-dimensional object when manufacturing the three-dimensional object by a fused deposition modeling type 3D printer, containing a polymer that is used in the soluble material for three-dimensional modeling according to any one of <1> to <48> and a filler that is used in the soluble material for three-dimensional modeling according to any one of <1> to <48>, in which the content of the filler is 0.01 part by mass to 200 parts by mass with respect to 100 parts by mass of the polymer.

<55> The support material according to <54>, in which the three-dimensional object is manufactured by the method for manufacturing a three-dimensional object according to any one of <49> to <53>.

<56> Use of the soluble material for three-dimensional modeling according to any one of <1> to <48> as a material of the support material.

EXAMPLES

<Evaluation Methods>
[Molecular Weight and Molecular Weight Distribution]

A calibration curve was generated from standard polystyrene using a gel permeation chromatography (GPC) method under the following conditions to obtain the weight average molecular weight (Mw).
(Measurement Conditions)
Apparatus: HLC-8320 GPC (detector integrated type, manufactured by Tosoh Corporation)
Column: α-M×2 columns (7.8 mm I.D.×30 cm, manufactured by Tosoh Corporation)
Eluent: 60 mmol/l Phosphoric acid+50 mmol/l brominated lithium dimethylformamide solution
Flow rate: 1.0 ml/min
Column temperature: 40° C.
Detector: RI detector
Standard substance: polystyrene
[Glass Transition Temperature]

A portion of the amorphous film was cut out, and 5 mg to 10 mg of the film was precisely weighed and sealed in an aluminum pan. The aluminum pan was heated from 25° C. to 250° C. at 10° C./min, and rapidly cooled to 25° C. using a DSC apparatus ("DSC7020" manufactured by Seiko Instruments Inc.). Then, the temperature was increased again to 250° C. at 10° C./min to obtain a DSC curve. The glass transition temperature (° C.) was obtained from the DSC curve.
[Content of Hydrophilic Unit]

The content of the hydrophilic unit was calculated by proton NMR measurement.
[Fiber Diameter and Fiber Length of Fibrous Filler and Thickness of Flat Filler]

Water was added to a fibrous filler with a solid content concentration of 0.0001% by mass to prepare a dispersion. An atomic force microscope (AFM, "Nasoscope III Tapping mode AFM" manufactured by Digital Instruments, Inc., "Point Probe (NCH)" manufactured by NANOSENSORS was used as a probe) was used to observe a sample obtained by dropping the dispersion on mica and drying the dispersion. In this way, the fiber height of the fibrous filler in the sample for observation was measured. Then, 5 or more pieces of fibrous filler were extracted in a microscopic image from which the fibrous filler can be confirmed, and the average fiber diameter and the fiber length were calculated from the fiber heights and the lengths of the filler, respectively. From a SEM image of 3,000 to 6,000 magnifications obtained by a field emission type scanning electron microscope ("FE-SEM S-4000" manufactured by Hitachi, Ltd.), 10 or more pieces of filler that were confirmed to be flat were extracted, their thicknesses were measured, and an average value of the thicknesses was calculated.
[Aspect Ratio of Fibrous Filler]

The fiber length of the fibrous filler was divided by the fiber diameter to obtain the aspect ratio.
[Particle Size]

The average particle size was measured using a laser diffraction/scattering type particle size distribution measuring apparatus "LA-920" manufactured by Horiba, Ltd. The sample was treated with ultrasonic waves for 1 minute before the measurement of the particle size, and a median diameter as a volume standard was measured at a temperature of 25° C. using ethanol as a dispersion medium of the sample.

Synthesis of Fillers

Synthesis Example 1: Cellulose Single Nanofibers (CSNF)

With 297 g of ion-exchanged water, 3 g of coniferous bleached kraft pulp fiber was sufficiently stirred, and 1.25 wt % of TEMPO (2,2,6,6-tetramethylpiperidine-1-oxyl manufactured by Sigma-Aldrich Corporation), 14.2 wt % of 5% sodium hypochlorite (manufactured by Wako Pure Chemical Industries, Ltd.), and 12.5 wt % of sodium bromide (manufactured by Wako Pure Chemical Industries, Ltd.) were added to 3 g of pulp mass in this order. An oxidation reaction was performed for 60 minutes while keeping the temperature at 20° C. and the pH at 10.5 by dropping 0.5 M sodium hydroxide (manufactured by Wako Pure Chemical Industries, Ltd.) using a pH stat to obtain oxidized pulp (CSNF (1)). Next, the oxidized pulp was thoroughly washed with ion-exchanged water and dehydrated, and naturally dried in an atmosphere of 23° C. Then, 0.75 g of the oxidized pulp and 74.25 g of ion-exchanged water were stirred for 10 minutes by a mixer to perform a refining treatment of fibers, and a semi-transparent CSNF (1) suspension was obtained. The amount of CSNF (1) (solid content concentration) in the obtained dispersion was 1.0 wt %. This CSNF (1) had a fiber length of 0.5 μm, an aspect ratio of 220, and a content of carboxyl groups of 1.6 mmol/g. Further, an oxidation reaction was performed by the above-described method on coniferous bleached kraft pulp with a different fiber length. As a result, a CSNF (2) suspension (concentration=1.0 wt %) having a fiber length of 0.3 μm and an aspect ratio of 75 was obtained.
[Synthesis Example 2: Acid Type CSNF]

To the CSNF (1) suspension obtained in Synthesis Example 1, 1 N hydrochloric acid was added, and the mixture was stirred to protonate CSNF (1) with the produced carboxylic acid. Dimethylformamide (DMF) was added to the protonated CSNF (1) suspension and mixed. The mixture was filtered. The filtration was repeated by adding DMF again to the solid obtained by filtration to perform solvent substitution to DMF. The obtained acid type CSNF DMF suspension had a solid content of 3.2 wt %.

Synthesis of Polymer

Synthesis Example 3: Polymer 1

In a 3-liter glass reactor equipped with two dropping funnels, a cooling tube, a thermometer, and a stirring blade, 150 g of acetone and 150 g of ethanol were charged. Nitrogen bubbling was performed for 30 minutes, and the temperature was increased to 60° C. Then, each of the following formulations 1 and 2 was dropped in 60 minutes. The mixture was kept at 60° C., and the polymerization reaction was continued for 5 hours. The solvent was removed from the mixture by evaporation, and the mixture was dried in a vacuum dryer at 60° C. overnight to obtain a polymer 1. The obtained polymer had a weight average molecular weight Mw of 105,000, and a glass transition temperature of 115° C. The content of the acrylic acid unit in the polymer was 37 wt %.

Formulation 1: acrylic acid (manufactured by Kanto Chemical Co., Ltd.) 200 g, methyl methacrylate (manufactured by Wako Pure Chemical Industries, Ltd.) 300 g, acetone 250 g, ethanol 250 g Formulation 2: V-65B (2,2'-azobis(2,4-dimethylvarelonitrile) manufactured by Wako Pure Chemical Industries, Ltd.) 7.17 g, acetone 100 g, ethanol 100 g Synthesis Example 4: Polymer 2

Polymer 2 was obtained in the same way as in Synthesis Example 3 except that the formulation 1 was changed to a formulation 3, the formulation 2 was changed to a formulation 4, and the polymerization temperature was changed to 70° C. The obtained polymer had a weight average molecular weight Mw of 57,800, and a glass transition temperature of 115° C. The content of the acrylic acid unit in the polymer was 39 wt %.

Formulation 3: acrylic acid (manufactured by Kanto Chemical Co., Ltd.) 120 g, methyl methacrylate (manufactured by Wako Pure Chemical Industries, Ltd.) 180 g, acetone 150 g, ethanol 150 g Formulation 4: V-65B (2,2'-azobis(2,4-dimethylvarelonitrile) manufactured by Wako Pure Chemical Industries, Ltd.) 4.30 g, acetone 60 g, ethanol 60 g The polymers and fillers that were used in examples and comparative examples are given below.

CNF: cellulose nanofibers, BiNFi-s (manufactured by Sugino Machine, Ltd., specific surface area=100 to 200 ($m^2/g$))

Talc: talc, MICRO ACE P-6 (manufactured by Nipppon Talc Co., Ltd., apparent density (JIS-K5101)=0.13 (g/ml), specific surface area (BET method)=10.5 ($m^2/g$))

PVA: polyvinyl alcohol, KURARAY POVAL 117 (manufactured by Kuraray Co., Ltd., number average molecular weight: 75,000)

<Preparation of Film>

[Preparation of Film 1]

The polymer 1 was dissolved in dimethylformamide (DMF) to prepare a DMF solution having a content of the polymer 1 of 2.8 wt % (hereinafter 2.8% DMF solution of the polymer 1). Then, 101 g of this solution and 19 g of the DMF solution of the acid type CSNF (solid content 3.2 wt %) obtained in Synthesis Example 2 were mixed together using a high pressure homogenizer ("Nanomizer System NMII" manufactured by Yoshida Kikai Co., Ltd.) to obtain a solution with high viscosity. This solution was developed in a Teflon (registered trade mark) petri dish, and dried in a vacuum dryer at 100° C. overnight to obtain a dried film (film 1) having a thickness of about 0.25 mm containing a filler.

[Preparation of Film 2]

Film 2 containing a filler was prepared in the same way as the preparation of the film 1 except that the amount of the DMF solution of the acid type CSNF (solid content 3.2 wt %) was changed to 8.5 g.

[Preparation of Film 3]

First, 20 g of 2.8 wt % DMF solution of the polymer 1 and 5.9 g of a water dispersion of CNF (solid content 3.0 wt %) were mixed together, and the mixture was irradiated with ultrasonic waves for 20 minutes to disperse CNF in the polymer solution. This solution was developed in a Teflon (registered trade mark) petri dish, and dried in a vacuum dryer at 100° C. overnight to obtain a dried film (film 3) having a thickness of about 0.25 mm containing a filler.

[Preparation of Film 4]

First, 20 g of 2.8 wt % DMF solution of the polymer 1 and 0.126 g of talc were mixed together, and the mixture was irradiated with ultrasonic waves for 20 minutes to disperse the talc in the polymer solution. This solution was developed in a Teflon (registered trade mark) petri dish, and dried in a vacuum dryer at 100° C. overnight to obtain a dried film (film 4) having a thickness of about 0.25 mm containing a filler.

[Preparation of Film 5]

Water was put in a flask equipped with a stirring blade, and PVA was dispersed in water with stirring. The dispersion was heated to 90° C. or more with stirring, and PVA was dissolved in the dispersion to obtain a 4 wt % PVA aqueous solution. The CNF (1) suspension was mixed at a ratio of 20 parts by mass to the prepared 4 wt % PVA aqueous solution, and the mixture was dispersed by ultrasonic waves and developed in a petri dish. The mixture was dried at 40° C. for a day and vacuum-dried at 50° C. for 2 days or more to obtain a dried film (film 5) having a thickness of about 0.2 mm.

[Preparation of Film 6]

Water was put in a flask equipped with a stirring blade, and PVA was dispersed in water with stirring. The dispersion was heated to 90° C. or more with stirring, and PVA was dissolved in the dispersion to obtain a 4 wt % PVA aqueous solution. The CNF (2) suspension was mixed at a ratio of 10 parts by mass to the prepared 4 wt % PVA aqueous solution, and the mixture was dispersed by ultrasonic waves and developed in a petri dish. The mixture was dried at 40° C. for a day and vacuum-dried at 50° C. for 2 days or more to obtain a dried film (film 6) having a thickness of about 0.2 mm.

[Preparation of Film 7]

A dried film (film 7) was obtained by the same method as in the preparation of the film 1 without compounding acid type cellulose single nanofibers.

[Preparation of Film 8]

A dried film (film 8) was obtained by the same method as in the preparation of the film 5 without compounding cellulose single nanofibers.

[Preparation of Film 9]

First, 11 g of 10 wt % DMF solution of the polymer 2 and 0.22 g of cellulose powder (manufactured by Wako Pure Chemical Industries, Ltd.) were mixed together, and the mixture was irradiated with ultrasonic waves for 20 minutes to disperse the cellulose powder in the DMF solution. This solution was developed in a Teflon (registered trade mark) petri dish, and dried in a vacuum dryer at 100° C. overnight to obtain a dried film (film 9) having a thickness of about 0.25 mm containing a filler.

[Preparation of Film 10]

A dried film (film 10) was obtained by the same method as in the preparation of the film 9 by compounding glass fibers manufactured by Nitto Boseki Co., Ltd. instead of cellulose powder.

EXAMPLES AND COMPARATIVE EXAMPLES

Examples 1 to 7 and Comparative Examples 1 to 3

Each of the obtained dried films was cut into an appropriate size, and was stored in a desiccator whose relative humidity was adjusted to 98% at room temperature for 2 days or more. Right after storage, the film was heated at 150°

C. for 5 minutes using an infrared moisture meter ("MOISTURE BALANCE MOC-120H" manufactured by Shimadzu Corporation), and the occurrence of foaming and the deformation in the film was visually confirmed. The case in which no foaming and no deformation in the film were observed was marked as "A," the case in which the deformation was not observed even though foaming occurred in the film to some extent was marked as "B," and the case in which the occurrence of foaming and/or the deformation in the film was clearly observed was marked as "C." "A" and "B" were considered to have foaming resistance, and "C" was considered to have no foaming resistance. The evaluation results are shown in Table 1.

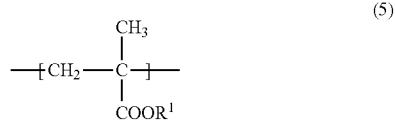
(5)

wherein $R^1$ represents a straight chain alkyl group or a branched alkyl group each having 1 to 8 carbon atoms

TABLE 1

|  | Film | Polymer | Type of filler | Form | Fiber length (μm) | Fiber diameter (μm) | Particle size (Median diameter) (μm) | Thickness (μm) | Part by mass with respect to 100 parts by mass of polymer | Performance Foaming resistance |
|---|---|---|---|---|---|---|---|---|---|---|
| Example 1 | Film 1 | Polymer 1 | Acid type CSNF | Fiber | 0.5 | 0.0025 |  |  | 20 | A |
| Example 2 | Film 2 | Polymer 1 | Acid type CSNF | Fiber | 0.5 | 0.0025 |  |  | 10 | A |
| Example 3 | Film 3 | Polymer 1 | CNF | Fiber | 2 | 0.0055 |  |  | 20 | A |
| Example 4 | Film 4 | Polymer 1 | Talc | Flat |  |  | 4 | 0.32 | 20 | B |
| Example 5 | Film 5 | PVA | CSNF (1) | Fiber | 0.5 | 0.0025 |  |  | 20 | A |
| Example 6 | Film 6 | PVA | CSNF (2) | Fiber | 0.3 | 0.003 |  |  | 10 | A |
| Example 7 | Film 10 | Polymer 2 | Glass fibers | Fiber | 500 | 13 |  |  | 20 | A |
| Comparative Example 1 | Film 7 | Polymer 1 | None |  |  |  |  |  |  | C |
| Comparative Example 2 | Film 8 | PVA | None |  |  |  |  |  |  | C |
| Comparative Example 3 | Film 9 | Polymer 2 | Cellulose | Sphere |  |  | 38 |  | 20 | C |

The invention claimed is:

1. A soluble material for three-dimensional modeling that is used as a material of a support material that supports a three-dimensional object when manufacturing the three-dimensional object with a fused deposition modeling type 3D printer, wherein the soluble material for three-dimensional modeling comprises at least one polymer having a glass transition temperature in the range 60° C. to 200° C. and at least one filler, said at least one polymer and at least one filler being selected to enable removal of said support material from said three-dimensional object upon contact with an alkaline aqueous solution and/or water, wherein the polymer contains a copolymer A having a hydrophilic monomer unit and a hydrophobic monomer unit, the copolymer A being at least one member selected from the group consisting of the following (I) to (IV):

(I) Copolymer having a hydrophilic monomer unit represented by the following formula (1)

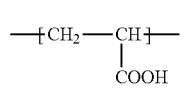
(1)

and at least one member selected from the group consisting of hydrophobic monomer units represented by the following formulae (5) to (7)

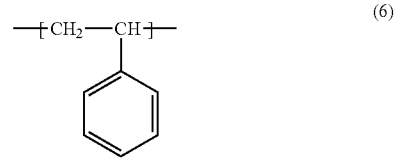
(6)

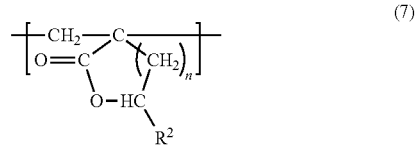
(7)

wherein n is 1 to 3, and $R^2$ represents a hydrogen atom or a methyl group, in which the content of the hydrophilic monomer unit in the copolymer is 20% by mass to 80% by mass;

(II) Copolymer having a hydrophilic monomer unit represented by the following formula (2)

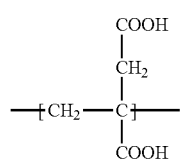
(2)

and at least one member selected from the group consisting of hydrophobic monomer units represented by the following formula (8)

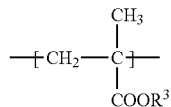

(8)

wherein $R^3$ represents an alkyl group having 1 or 2 carbon atoms, in which the content of the hydrophilic monomer unit in the copolymer is 20% by mass to 80% by mass;

(III) Copolymer having a hydrophilic monomer unit represented by the following formula (3)

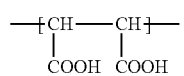

(3)

and a hydrophobic monomer unit represented by the following formula (9)

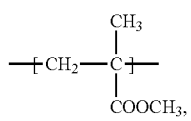

(9)

in which the content of the hydrophilic monomer unit in the copolymer is 20% by mass to 80% by mass; and (IV) Copolymer having a hydrophilic monomer unit represented by the following formula (4)

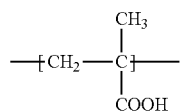

(4)

and at least one member selected from the group consisting of hydrophobic monomer units represented by the following formulae (5) and (6)

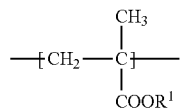

(5)

wherein $R^1$ represents a straight chain alkyl group or a branched alkyl group each having 1 to 8 carbon atoms

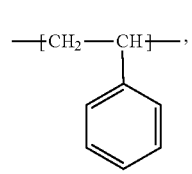

(6)

in which the content of the hydrophilic monomer unit in the copolymer is 20% by mass to 80% by mass, or the polymer contains at least one polymer B selected from the group consisting of polyvinyl alcohol, polyethylene glycol, an ethylene glycol propylene glycol copolymer, a sulfonate, a carboxylate, and water-soluble polyester and/or polyamide in which a polyethylene oxide unit is introduced, and the filler is a fibrous filler having a fiber length of 0.2 µm to 10 µm, a fiber diameter of 0.001 µm to 0.01 µm, and an aspect ratio of 70 to 300, the content of the filler in the soluble material being 0.01 part by mass to 200 parts by mass with respect to 100 parts by mass of the polymer.

2. The soluble material for three-dimensional modeling according to claim 1, wherein the fibrous filler is at least one member selected from the group consisting of cellulose fibers, cellulose nanofibers obtained by mechanically refining cellulose fibers, and cellulose single nanofibers that are cellulose obtained by an action of an N-oxyl compound.

3. The soluble material for three-dimensional modeling according to claim 2, wherein the cellulose single nanofibers contain 0.1 mmol/g or more of carboxyl groups.

4. The soluble material for three-dimensional modeling according to claim 1, wherein the fiber length of the fibrous filler is 0.2 µm to 5 µm.

5. The soluble material for three-dimensional modeling according to claim 1, wherein the glass transition temperature of the soluble material for three-dimensional modeling is 60° C. to 200° C.

6. A support material configured to support a three-dimensional object when manufacturing the three-dimensional object by utilizing a fused deposition modeling type 3D printer, said support material containing a polymer and a filler that are used in the soluble material for three-dimensional modeling according to claim 1, wherein the content of the filler is 0.01 part by mass to 200 parts by mass with respect to 100 parts by mass of the polymer.

7. The support material according to claim 6, wherein the support material configured to support a three-dimensional object when manufacturing the three-dimensional object by utilizing a fused deposition modeling type 3D printer is configured to enable manufacture of the three-dimensional object by a step of obtaining a precursor of a three-dimensional object containing the three-dimensional object and said support material, and a support material removing step of contacting the precursor of the three-dimensional object with an alkaline aqueous solution to remove the support material.

8. A method for manufacturing a three-dimensional object by fused deposition modeling, comprising a step of obtaining a precursor of a three-dimensional object containing the three-dimensional object and a support material, and a support material removing step of making the precursor of the three-dimensional object contact an alkaline aqueous solution to remove the support material, wherein a material of the support material is the soluble material for three-dimensional modeling according to claim 1.

9. The method for manufacturing a three-dimensional object according to claim 8, wherein a modeling material as a material for the three-dimensional object contains an ABS resin and/or a polylactic resin.

10. The method for manufacturing a three-dimensional object according to claim 8, comprising a support material removing step of soaking the precursor of the three-dimensional object in an alkaline aqueous solution and/or water to dissolve and remove the support material.

11. The method for manufacturing a three-dimensional object according to claim 10, wherein the pH of the alkaline aqueous solution is 10 to 14.

* * * * *